United States Patent
Wang et al.

(10) Patent No.: US 12,391,774 B2
(45) Date of Patent: Aug. 19, 2025

(54) HETEROPHASIC POLYPROPYLENE COPOLYMERS

(71) Applicant: BOREALIS AG, Vienna (AT)

(72) Inventors: Jingbo Wang, Linz (AT); Markus Gahleitner, Linz (AT); Klaus Bernreitner, Linz (AT); Luigi Maria Cristoforo Resconi, Linz (AT); Simon Schwarzenberger, Linz (AT)

(73) Assignee: BOREALIS AG, Vienna (AT)

( * ) Notice: Subject to any disclaimer, the term of this patent is extended or adjusted under 35 U.S.C. 154(b) by 785 days.

(21) Appl. No.: 17/763,278

(22) PCT Filed: Sep. 25, 2020

(86) PCT No.: PCT/EP2020/076901
§ 371 (c)(1),
(2) Date: Mar. 24, 2022

(87) PCT Pub. No.: WO2021/058742
PCT Pub. Date: Apr. 1, 2021

(65) Prior Publication Data
US 2023/0002605 A1    Jan. 5, 2023

(30) Foreign Application Priority Data

Sep. 25, 2019  (EP) ..................... 19199696
Nov. 26, 2019  (EP) ..................... 19211662

(51) Int. Cl.
| | | |
|---|---|---|
| C08F 10/06 | (2006.01) | |
| C07F 17/00 | (2006.01) | |
| C08F 4/02 | (2006.01) | |
| C08F 4/649 | (2006.01) | |
| C08F 4/6592 | (2006.01) | |
| C08F 210/06 | (2006.01) | |
| C08L 23/14 | (2006.01) | |

(52) U.S. Cl.
CPC ............ *C08F 4/6498* (2013.01); *C07F 17/00* (2013.01); *C08F 4/02* (2013.01); *C08F 4/65927* (2013.01); *C08F 10/06* (2013.01); *C08F 210/06* (2013.01); *C08L 23/142* (2013.01); *C08F 2420/07* (2021.01); *C08F 2420/10* (2021.01); *C08F 2800/20* (2013.01); *C08L 2205/025* (2013.01)

(58) Field of Classification Search
CPC ...... C08F 4/6498; C08F 4/02; C08F 4/65927; C08F 10/06; C08F 210/06; C08F 2420/07; C08F 2420/10; C08F 2800/20; C08F 4/65908; C08F 4/65912; C08F 4/65916; C08F 110/06; C08F 210/16; C08F 4/6492; C08F 2/001; C08F 2500/03; C08F 2500/12; C08F 2500/17; C08F 2500/27; C08F 2500/35; C08F 2500/34; C08F 2500/33; C08F 2500/01; C07F 17/00; C07F 7/00; C08L 23/142; C08L 2205/025; C08L 23/10; C08L 23/14; Y02P 20/52

See application file for complete search history.

(56) References Cited

U.S. PATENT DOCUMENTS

| | | |
|---|---|---|
| 5,780,660 A | 7/1998 | Lin et al. |
| 6,262,286 B1 | 7/2001 | Gregorius et al. |
| 7,098,354 B2 | 8/2006 | Damrau et al. |
| 7,341,971 B2 | 3/2008 | Denifl et al. |
| 7,465,688 B2 | 12/2008 | Guidotti et al. |
| 7,671,223 B2 | 3/2010 | Garcia et al. |
| 7,842,801 B2 | 11/2010 | Baettig et al. |
| 8,933,256 B2 | 1/2015 | Castro et al. |
| 8,946,363 B2 | 2/2015 | Resconi et al. |
| 9,029,284 B2 | 5/2015 | Resconi et al. |
| 9,079,985 B2 | 7/2015 | Resconi et al. |
| 9,469,700 B2 | 10/2016 | Kallio et al. |
| 9,475,890 B2 | 10/2016 | Kallio et al. |
| 9,540,465 B2 | 1/2017 | Greco et al. |
| 10,035,866 B2 | 7/2018 | Denifl et al. |
| 10,167,355 B2 | 1/2019 | Ajellal et al. |

(Continued)

FOREIGN PATENT DOCUMENTS

| | | |
|---|---|---|
| EP | 0768320 A1 | 4/1997 |
| EP | 0819695 B1 | 4/2003 |

(Continued)

OTHER PUBLICATIONS

International search report and written opinion mailed Feb. 1, 2021 in International Application No. PCTEP2020076897 (16 pages).

(Continued)

*Primary Examiner* — K. Boyle

(74) *Attorney, Agent, or Firm* — Meunier Carlin & Curfman LLC

(57) ABSTRACT

A heterophasic polypropylene copolymer having an MFR2 of 0.05 to 20 g/10 min (ISO 1133 at 230° C. with a loading of 2.16 kg) and a melting point (Tm) of 156 to 164° C. (measured by DSC according to ISO 11357) wherein the heterophasic polypropylene copolymer comprises at least the following components: (A) 55.0 to 95.0 wt % of a crystalline fraction (CF) having a comonomer content of 0 to 3.0 wt %; and (B) 5.0 to 45.0 wt % of a soluble fraction (SF) having a comonomer content of 12 to 45 wt %; wherein the intrinsic viscosity (IV) (in decalin at 135° C.) of the soluble fraction (SF) is 2.5 to 11 dl/g, and wherein the amount of crystalline fraction (CF) and the amount of soluble fraction (SF) are determined in 1,2,4-trichlorobenzene at 40° C.

22 Claims, No Drawings

(56) References Cited

U.S. PATENT DOCUMENTS

| | | | |
|---|---|---|---|
| 10,875,993 | B2 | 12/2020 | Gahleitner et al. |
| 10,982,019 | B2 | 4/2021 | Saeed et al. |
| 11,078,304 | B2 | 8/2021 | Resconi et al. |
| 11,192,963 | B2 | 12/2021 | Fait et al. |
| 2001/0044505 | A1 | 11/2001 | Ford et al. |
| 2003/0203809 | A1 | 10/2003 | Kao et al. |
| 2004/0254310 | A1 | 12/2004 | Winslow et al. |
| 2006/0116490 | A1 | 6/2006 | Paczkowski et al. |
| 2013/0095267 | A1* | 4/2013 | Cavalieri ........... B32B 27/32 525/240 |
| 2018/0155459 | A1 | 6/2018 | Li et al. |
| 2019/0308995 | A1 | 10/2019 | Ajellal et al. |
| 2020/0079884 | A1 | 3/2020 | Ajellal et al. |
| 2020/0190229 | A1 | 6/2020 | Denifl et al. |
| 2021/0002390 | A1 | 1/2021 | Sumerin et al. |
| 2021/0002397 | A1 | 1/2021 | Hoff et al. |
| 2021/0017307 | A1 | 1/2021 | Izmer et al. |
| 2021/0079128 | A1 | 3/2021 | Reznichenko et al. |
| 2021/0095057 | A1 | 4/2021 | Resconi et al. |
| 2021/0179744 | A1 | 6/2021 | Reznichenko et al. |
| 2021/0292355 | A1 | 9/2021 | Ajellal et al. |

FOREIGN PATENT DOCUMENTS

| | | |
|---|---|---|
| EP | 2072546 B1 | 2/2010 |
| EP | 2368937 A1 | 9/2011 |
| EP | 2933277 A1 | 10/2015 |
| EP | 2729529 B1 | 4/2016 |
| EP | 2824142 B1 | 4/2016 |
| EP | 2829558 B1 | 12/2016 |
| EP | 2545084 B1 | 8/2017 |
| EP | 3201268 B1 | 12/2018 |
| KR | 20060123293 A | 12/2006 |
| KR | 20170073463 A | 6/2017 |
| WO | 9414856 A1 | 7/1994 |
| WO | 9512622 A1 | 5/1995 |
| WO | 0202576 A1 | 1/2002 |
| WO | 2006097497 A1 | 9/2006 |
| WO | 2006100258 A1 | 9/2006 |
| WO | 2007116034 A1 | 10/2007 |
| WO | 2011160946 A1 | 12/2011 |
| WO | 2014096171 A1 | 6/2014 |
| WO | 2016038210 A1 | 3/2016 |
| WO | 2016038211 A1 | 3/2016 |
| WO | 2018122134 A1 | 7/2018 |
| WO | 2019179959 A1 | 9/2019 |
| WO | 2020002654 A1 | 1/2020 |
| WO | 2020011825 A1 | 1/2020 |
| WO | 2020208128 A1 | 10/2020 |
| WO | 2020239598 A1 | 12/2020 |
| WO | 2020239602 A1 | 12/2020 |
| WO | 2020239603 A1 | 12/2020 |

OTHER PUBLICATIONS

International search report and written opinion mailed Nov. 25, 2020 in International Application No. PCTEP2020076901 (10 pages).
Busico, et al., Polymerization in the Presence of a Monocyclopentadienyl Zirconium(IV) Acetamidinate Catalyst: Microstructural and Mechanistic Insights, Macromol. Rapid Commun. 2007, 28, 1128.
Cheng, H N. , 13C NMR Analysis of Ethylene-Propylene Rubbers, Macromolecules 1984, 17, 1950.
Del Hierro, P et al., Soluble Fraction Analysis in polypropylene, The Column, Feb. 2014. pp. 18-23.
Grein, et al., Impact modified isotatic polypropylene with controlled rubber intrinsic viscosities: Some new aspects about morphology and fracture, J. Appl. Polym. Sci. 2003, 87, 1702-1712.
Grein, et al., Melt viscosity effects in ethylene-propylene copolymers, Rheol. Acta, 2007, 46, 1083-1089.
MacHat, Martin et al., "Ultrarigid indenyl-based hafnocene complexes for the highly isoselective polymerization of propene: tunable polymerization performance adopting various sterically demanding 4-aryl substituents," Organometallics, 2016, 36(2), 399-408.
Premphet, et al., Polypropylene/metallocene ethylene-octene copolymer blends with a bimodal particle size distribution: Mechanical properties and their controlling factors, J. Appl. Polym. Sci. 2002, 85, 2412-2418.
Resconi, L et al., Selectivity in Propene Polymerization with Metallocene Catalyts, Chem. Rev. 2000, 100 (4), 1253.
Wang, W J. et al., Structural analysis of ethylene/propylene copolymers synthesized with a constrained geometry catalyst, Macromolecules, 2000, 33, 1157.
Zhou, Z et al., A new decoupling method for accurate quantification of polyethylene copolymer composition and triad sequence distribution with 13C NMR, J. Mag. Reson. 187 (2007) 225.

* cited by examiner

HETEROPHASIC POLYPROPYLENE COPOLYMERS

CROSS REFERENCE TO RELATED APPLICATIONS

This application is a United States National Phase Patent Application of International Patent Application Number PCT/EP2020/076901, filed on Sep. 25, 2020, which claims the benefit of priority to EP Application Serial No. 19211662.2, filed Nov. 26, 2019, and EP Application Serial No. 19199696.6, filed Sep. 25, 2019, all of which are incorporated by reference herein their entirety.

This invention relates to heterophasic polypropylene copolymers which can be prepared from certain bisindenyl metallocene catalysts. In particular, the heterophasic polypropylene copolymers of the invention have a soluble fraction (B) with high molecular weight, and hence low MFR, and a crystalline fraction (A) of high melting point.

BACKGROUND

Metallocene catalysts have been used to manufacture polyolefins for many years. Countless academic and patent publications describe the use of these catalysts in olefin polymerization. Metallocenes are now used industrially and polyethylenes and polypropylenes in particular are often produced using cyclopentadienyl based catalyst systems with different substitution patterns.

These metallocenes are often used to prepare polypropylenes such as isotactic polypropylene. Metallocenes, whose structure has been optimized to produce high molecular weight isotactic polypropylene, often show limitations in their molecular weight capability when used to produce heterophasic polypropylene with an ethylene-propylene copolymer in the gas phase. It is known that tensile and impact properties of a heterophasic polypropylene, for a given rubber comonomer composition, can be improved by increasing the molecular weight of the rubber phase (as described for example in J. Appl. Polym. Sci. 2002, vol. 85, pp. 2412-2418 and in J. Appl. Polym. Sci. 2003, vol. 87, pp. 1702-1712). Typically however, the ethylene-propylene rubber molecular weight (measured as intrinsic viscosity IV(EPR) is less than 4 dl/g, measured in decahydronaphthalene (decalin) at 135° C.

In addition, metallocene catalysts which might be used for the preparation of heterophasic polypropylene tend to produce a homopolymer matrix (and hence a heterophasic polypropylene polymer as a whole) with relatively low melting point (Tm), usually below 155-157° C. It is known that a higher Tm is beneficial for the material stiffness. The combination of a high melting point of the homopolymer matrix (or a high melting point of the heterophasic polypropylene itself) and high molecular weight in the EPR rubber component is especially desirable.

In this regard, a heterophasic polypropylene is one that comprises a propylene homopolymer matrix (or a propylene copolymer matrix with a low comonomer content, i.e. a random propylene copolymer) and a propylene ethylene (or propylene-ethylene-1-butene) rubber component which is typically dispersed within the matrix.

The present inventors have found that heterophasic polypropylene copolymers with advantageous properties can be prepared using certain metallocene catalysts.

The metallocenes complexes of use in the preparation of the heterophasic polypropylene copolymers of the invention are asymmetric hafnium bridged bisindenyl type structures. The prior art discloses some metallocenes that are similar to those used.

C2-symmetric metallocenes are disclosed in WO2007/116034. This document reports the synthesis and characterisation of, inter alia, the metallocene rac-Me2Si(2-Me-4-Ph-5-OMe-6-tBuInd)2ZrCl2 and the use of it as a polymerization catalyst after activation with MAO for the homopolymerization of propylene and copolymerization of propylene with ethylene and higher alpha-olefins in solution polymerization. The IV of the produced polymers is around 3 to 3.4 dl/g, measured in tetrahydronaphthalene (THN) at 135° C. IV values measured in decalin are around 20% higher than those measured in THN.

WO2006/097497 describes, inter alia, rac-Me2Si(2-Me-4-Ph-1,5,6,7-tetrahydro-s-indacen-1-yl)2ZrCl2 supported on silica and its use in the homo- and copolymerization of propylene with ethylene. The IV of the produced polymers is around 3 to 3.4 dl/g, measured in THN at 135° C.

WO2006/100258 describes the use of pseudo rac Dimethylsilanediyl-(6-methyl-4-(4'-tert-butylphenyl)-1,2,3,5-tetrahydro-s-indacen-7-yl)(2-isopropyl-4-(4'-tert-butylphenyl)-1-indenyl)-zirconium dichloride to make heterophasic polypropylene but again, low IVs are reported.

EP2072546 describes the synthesis of heterophasic polypropylene using a support-free asymmetric metallocene dimethylsilyl [(2-methyl-(4'-tert.butyl)-4-phenyl-indenyl)(2-isopropyl-(4'-tert.butyl)-4-phenyl-indenyl)]zirconium dichloride. The highest IV of the EPRs is reported as 3.4 d/g, measured in decalin at 135° C.

EP2072584 describes the synthesis of heterophasic polypropylene using a support-free asymmetric metallocene dimethylsilyl [(2-methyl-(4'-tert.butyl)-4-phenyl-indenyl)(2-isopropyl-(4'-tert.butyl)-4-phenyl-indenyl)]zirconium dichloride. The highest IV of the EPRs is reported as 2 dl/g, measured in decalin at 135° C.

A number of known metallocene catalyst complexes are set out in the table below:

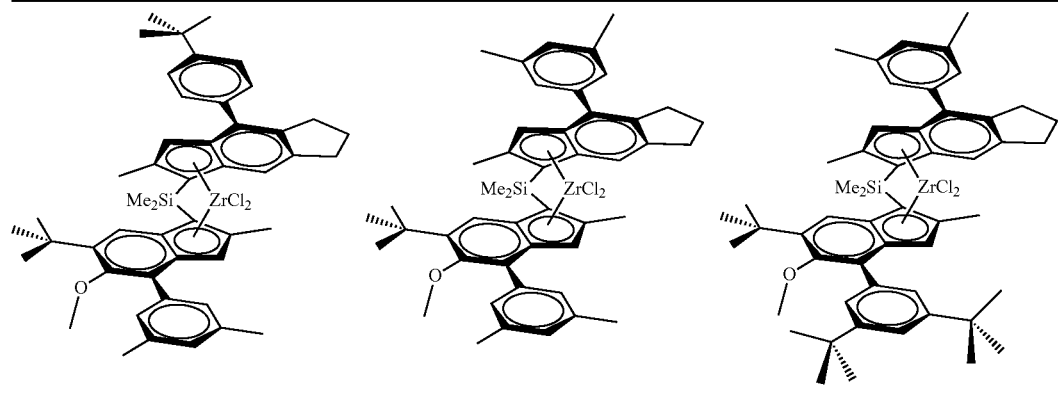

| Anti-dimethylsilanediyl[2-methyl-4-(3,5-dimethylphenyl)-5-methoxy-6-tert-butylinden-1-yl][2-methyl-4-(4-tert-butylphenyl)-1,5,6,7-tetrahydro-s-indacen-1-yl]zirconium dichloride WO2018122134 | Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride WO2018122134 | Anti-dimethylsilanediyl[2-methyl-4-(3,5-di-tert-butylphenyl)-5-methoxy-6-tert-butyl-inden-1-yl][2-methyl-4-(3,5-dimethylphenyl)-5,6,7-trihydro-s-indacen-1-yl]zirconium dichloride WO2018122134 |

The metallocene structures above are shown to offer IV(XS) values of 3.4 dl/gdl/g, measured in decalin at 135° C.

WO2016/038210 and WO2016/038211 also describe heterophasic polypropylene polymerisation using the likes of rac-Dimethylsilylene-bis(6-tert-butyl-2-isobutyl-5-methoxy-4-phenyl-1H-inden-1-yl) zirconium dichloride. Again IV(EPR) values are low, such as 3.0 dl/gdl/g or less.

In EP2829558, the use of a borate co-activator in unsupported single Site catalyst reveals that the borate co-activator has a detrimental effect on the molecular weight of the rubber.

In WO2013/007650, various heterophasic polypropylene copolymers are described which have a low IV(XS) and a high XS fraction.

In EP2824142, heterophasic polypropylene copolymers are prepared with low IV(XS) and high MFR.

In EP3201268, a heterophasic polypropylene copolymer is combined with a polypropylene homopolymer. The heterophasic polypropylene copolymer described is one with a large amorphous fraction and low IV(XS).

WO2019/179959 describes catalysts suitable for the preparation of certain lower melting point heterophasic polypropylene copolymers.

WO 2011/160946 discloses blend comprising a heterophasic copolymer and a propylene hexene copolymer.

EP-A-2368937 discloses heterophasic polypropylene copolymers made in a multistep reaction with broad molecular weight distribution and high intrinsic viscosity.

The present inventors sought heterophasic polypropylene polymers with higher tensile and impact properties and with good stiffness, especially at low temperature. The solution to that problem is the claimed subject matter in which, inter alia, the molecular weight of the soluble fraction is high and the melting point of the heterophasic polypropylene copolymer is high. We have surprisingly found that the use of certain metallocenes also allows the preparation of these heterophasic polypropylene copolymers with a high IV(SF).

SUMMARY OF INVENTION

Viewed from one aspect the invention provides a heterophasic polypropylene copolymer having an $MFR_2$ of 0.05 to 20 g/10 min (ISO 1133 at 230° C. with a loading of 2.16 kg) and a melting point (Tm) of 156 to 164° C. (measured by DSC according to ISO 11357) wherein the heterophasic polypropylene copolymer comprises at least the following components:
(A) 55.0 to 95.0 wt % of a crystalline fraction (CF) having a comonomer content of 0 to 3.0 wt %; and
(B) 5.0 to 45.0 wt % of a soluble fraction (SF) having a comonomer content of 12 to 45 wt %;
wherein the intrinsic viscosity (IV) (in decalin at 135° C.) of the soluble fraction (SF) is 2.5 to 11 dl/g, and
wherein the amount of crystalline fraction (CF) and the amount of soluble fraction (SF) are determined in 1,2,4-trichlorobenzene at 40° C.

Viewed from another aspect the invention provides a heterophasic polypropylene copolymer as claimed in claim 1 having an $MFR_2$ of 0.1 to 20 g/10 min (ISO 1133 at 230° C. with a loading of 2.16 kg) and a melting point (Tm) of 157 to 164° C. (measured by DSC according to ISO 11357) wherein the heterophasic polypropylene copolymer comprises at least the following components:
(A) 55.0 to 80.0 wt % of a crystalline fraction (CF) having a comonomer content of 0 to 3.0 wt %; and
(B) 20.0 to 45.0 wt % of a soluble fraction (SF) having a comonomer content of 12 to 40 wt %;
wherein the intrinsic viscosity (IV) (in decalin at 135° C.) of the crystalline fraction (CF) is 1.5 to 5.0 dl/g;
wherein the intrinsic viscosity (IV) (in decalin at 135° C.) of the soluble fraction (SF) is 4.5 to 11 dl/g, and
wherein the amount of crystalline fraction (CF) and the amount of soluble fraction (SF) are determined in 1,2,4-trichlorobenzene at 40° C.

Viewed from another aspect the invention provides a heterophasic polypropylene copolymer having an $MFR_2$ of 0.05 to 2.5 g/10 min (ISO 1133 at 230° C. with a loading of 2.16 kg) and a melting point (Tm) of 156 to 163° C., wherein the heterophasic polypropylene copolymer comprises at least the following components:
(A) 75.0 to 95.0 wt % of a crystalline fraction (CF) having a comonomer content of 0 to 2.0 wt %; and
(B) 5.0 to 25.0 wt % of a soluble fraction (SF) having a comonomer content of 12 to 45 wt %;
wherein the intrinsic viscosity (IV) (in decalin at 135° C.) of the soluble fraction (SF) is 2.5 to 10 dl/g, and
wherein the amount of crystalline fraction (CF) and the amount of soluble fraction (SF) are determined in 1,2,4-trichlorobenzene at 40° C.

Viewed from another aspect the invention provides a heterophasic polypropylene copolymer having an $MFR_2$ of 0.05 to 2.5 g/10 min and a melting point (Tm) of 156 to 163° C.,
wherein the heterophasic polypropylene copolymer comprises at least the following components comprising:
(A) 75.0 to 95.0 wt % of a crystalline fraction (CF) having an ethylene (C2) content of 0 to 2.0 wt %; and
(B) 5.0 to 25.0 wt % of a soluble fraction (SF) wherein the C2(SF) is in the range of 12 to 40 wt % and wherein the intrinsic viscosity (SF) is 2.5 to 10 dl/g.

In one embodiment, the heterophasic polypropylene copolymers of the invention can be prepared using a metallocene complex of formula (I):

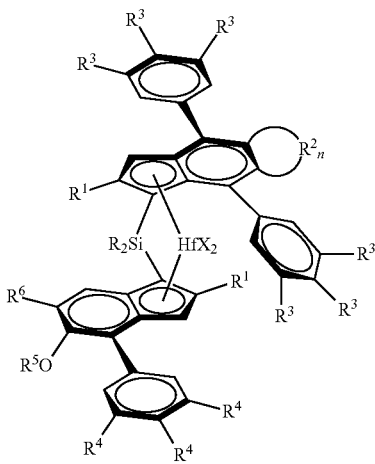

Formula (I)

each X is a sigma-ligand;
in the group $R_2Si$— at least one R is methyl or ethyl, and the other R is selected from methyl, ethyl, n-propyl, isopropyl, n-butyl or isobutyl, pentyl, hexyl, cyclohexyl and phenyl;
each $R^1$ independently is the same or can be different and are a $CH_2$—$R^7$ group, with $R^7$ being H or linear or branched $C_{1-6}$-alkyl group, $C_{3-8}$ cycloalkyl group, or $C_{6-10}$ aryl group;
each $R^2$ is independently a —CH=, —CY=, —$CH_2$—, —CHY— or —$CY_2$— group, wherein Y is a $C_{1-6}$ hydrocarbyl group and where n is 2-6;
each $R^3$ and $R^4$ are independently the same or can be different and are hydrogen, a linear or branched $C_{1-6}$-alkyl group, a $C_{7-20}$ arylalkyl, $C_{7-20}$ alkylaryl group, $C_{6-20}$ aryl group, or an —OY group, wherein Y is a is a $C_{1-6}$ hydrocarbyl group;
$R^5$ is a linear or branched $C_{1-6}$-alkyl group, $C_{7-20}$ arylalkyl, $C_{7-20}$ alkylaryl group or $C_{6-20}$-aryl group; and
$R^6$ is a $C(R^8)_3$ group, with $R^8$ being a linear or branched $C_{1-6}$ alkyl group;
(A) wherein at least one $R^3$ per phenyl group and at least one $R^4$ is not hydrogen, and wherein at least one $R^3$ per phenyl group and at least one $R^4$ is hydrogen; or
(B) wherein one $R^3$ is an —OY group, wherein Y is a is a $C_{1-6}$ hydrocarbyl group, in 4 position of each phenyl group and the two other $R^3$ groups are tert-butyl groups; and/or
(C) wherein one $R^4$ is an —OY group, wherein Y is a is a $C_{1-6}$ hydrocarbyl group, in 4-position of the phenyl ring and the two other $R^4$ groups are tert-butyl groups.

Viewed from another aspect the heterophasic polypropylene copolymer of the invention can be prepared using a metallocene catalyst comprising
(i) a metallocene catalyst complex of formula (I) as hereinbefore defined; and
(ii) a cocatalyst comprising a compound of a group 13 element.

The catalyst suitable for use in the preparation of the heterophasic polypropylene copolymers of the invention can be used in non-supported form or in solid form. The catalyst may be used as a homogeneous catalyst or heterogeneous catalyst. The catalyst in solid form, preferably in solid particulate form, can be either supported on an external carrier material, like silica or alumina or a mixed oxide such as silica-alumina or, in one embodiment, is free from an external carrier, however still being in solid form as described in WO2003/051934.

The catalyst suitable for use in the preparation of the heterophasic polypropylene copolymers of the invention may comprise
(i) a metallocene complex of formula (I) as hereinbefore defined;
(ii) a cocatalyst comprising a compound of group 13 element; and
(iii) a silica support.

The catalyst suitable for use in the preparation of the heterophasic polypropylene copolymers of the invention may also be a solid catalyst is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.

Viewed from another aspect the invention provides a process for the preparation of a heterophasic polypropylene copolymer as hereinbefore defined comprising polymerising:
(I) polymerising propylene and optionally ethylene and/or 1-butene in the presence of the catalyst so as to form:
a1) a crystalline fraction (CF) comprising a propylene homopolymer or propylene copolymer with ethylene and/or with 1-butene having 0 to 3 wt % comonomer as said matrix component; and
(II) subsequently polymerising additional propylene and ethylene and optionally 1-butene, preferably in the gas phase, in the presence of the matrix component of step (I) so as to form:
a2) a propylene ethylene copolymer or propylene-ethylene-1-butene copolymer soluble fraction (SF) having a comonomer content of 12 to 45 wt %;
wherein the crystalline fraction (CF) constitutes 55.0 to 95.0 wt % and the soluble fraction (SF) constitutes 5.0 to 45.0 wt % of the heterophasic propylene ethylene copolymer or heterophasic propylene ethylene 1-butene copolymer, wherein the amount of crystalline fraction (CF) and the amount soluble fraction (SF) are determined in 1,2,4-trichlorobenzene at 40° C.; and wherein the soluble fraction (SF) of the heterophasic propylene-ethylene copolymer or heterophasic propylene-ethylene-1-butene copolymer has an intrinsic viscosity IV(SF) in decalin at 135° C. of 2.5 to 11 dl/g.

In particular, the process requires (I) polymerising propylene and optionally ethylene and/or 1-butene in the presence of the catalyst according to the invention so as to form:

a1) a crystalline fraction (CF) comprising a propylene homopolymer or propylene copolymer with ethylene and/or with 1-butene having up to 2 wt % comonomer as said matrix component; and (II) subsequently polymerising additional propylene and ethylene and optionally 1-butene, preferably in the gas phase, in the presence of the matrix component of step (I) so as to form:

a2) a propylene ethylene copolymer or propylene-ethylene-1-butene copolymer soluble fraction (SF) having a comonomer content of 12 to 45 wt %;

wherein the crystalline fraction (CF) constitutes 75.0 to 95.0 wt % and the soluble fraction (SF) constitutes 5.0 to 25.0 wt % of the heterophasic propylene ethylene copolymer or heterophasic propylene ethylene 1-butene copolymer, wherein the amount of crystalline fraction (CF) and the amount soluble fraction (SF) are determined in 1,2,4-trichlorobenzene at 40° C.; and wherein the soluble fraction (SF) of the heterophasic propylene-ethylene copolymer or heterophasic propylene-ethylene-1-butene copolymer has an intrinsic viscosity IV(SF) in decalin at 135° C. of 2.5 to 10 dl/g, preferably 4.5 to 9.0 dl/g, most preferably 5.5 to 8.0 dl/g.

Preferably the comonomer is ethylene only.

Definitions

Throughout the description, the following definitions are employed:

By "free from an external carrier" is meant that the catalyst does not contain an external support, such as an inorganic support, for example, silica or alumina, or an organic polymeric support material.

The term "C1-20 hydrocarbyl group" includes C1-20 alkyl, C2-20 alkenyl, C2-20 alkynyl, C3-20 cycloalkyl, C3-20 cycloalkenyl, C6-20 aryl groups, C7-20 alkylaryl groups or C7-20 arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred C1-20 hydrocarbyl groups are C1-20 alkyl, C4-20 cycloalkyl, C5-20 cycloalkylalkyl groups, C7-20 alkylaryl groups, C7-20 arylalkyl groups or C6-20 aryl groups, especially C1-10 alkyl groups, C6-10 aryl groups, or C7-12 arylalkyl groups, e.g. C1-8 alkyl groups. Most especially preferred hydrocarbyl groups are methyl, ethyl, propyl, isopropyl, tert-butyl, isobutyl, C5-6-cycloalkyl, cyclohexylmethyl, phenyl or benzyl.

The term "halo" includes fluoro, chloro, bromo and iodo groups, especially chloro or fluoro groups, when relating to the complex definition.

The oxidation state of the metal ion is governed primarily by the nature of the metal ion in question and the stability of the individual oxidation states of each metal ion.

It is appreciated that in the complexes of the invention, the metal ion is coordinated by ligands X to satisfy the valency of the metal ion and to fill its available coordination sites. The nature of these σ-ligands can vary greatly.

The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst. The term "molecular weight" is used herein to refer to weight average molecular weight Mw unless otherwise stated.

The amount of crystalline fraction (CF) and the amount of soluble fraction (SF) are determined in 1,2,4-trichlorobenzene at 40° C. The crystalline fraction is that part of the heterophasic propylene copolymer that does not dissolve in the solvent. The soluble fraction is correspondingly that portion that dissolves.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene polymer is present in such an amount that it forms a continuous phase which can act as a matrix.

Furthermore the terms "amorphous copolymer", "dispersed phase", "predominantly amorphous copolymer" and "rubber phase" denote the same, i.e. are interchangeable in the present invention. Amorphous means that the copolymer, when analysed by DSC as a pure component (after having been extracted from the matrix by xylene extraction), has a heat of fusion of less than 20 J/g.

The expression homopolymer used in the instant invention relates to a polypropylene that consists substantially of propylene units. In a preferred embodiment, only propylene units in the propylene homopolymer are detectable.

DETAILED DESCRIPTION OF INVENTION

This invention relates to heterophasic polypropylene copolymers which can be prepared using certain metallocene catalysts with an ideal combination of high matrix melting point with a low content of soluble fraction and low ethylene content in that soluble fraction.

In some embodiments, the soluble fraction (or rubber phase or amorphous fraction) has a high molecular weight, e.g. a high intrinsic viscosity. The crystalline fraction (or matrix phase) and hence the heterophasic polypropylene copolymer itself has a high melting point.

Heterophasic Polypropylene Copolymers

The heterophasic polypropylene copolymer of the invention has an MFR$_2$ of 0.05 to 20 g/10 min (ISO 1133 at 230° C. with a loading of 2.16 kg) and a melting point (Tm) of 156 to 164° C. (measured by DSC according to ISO 11357) wherein the heterophasic polypropylene copolymer comprises at least the following components:

(A) 55.0 to 95.0 wt % of a crystalline fraction (CF) having a comonomer content of 0 to 3.0 wt %; and (B) 5.0 to 45.0 wt % of a soluble fraction (SF) having a comonomer content of 12 to 45 wt %;

wherein the intrinsic viscosity (IV) (in decalin at 135° C.) of the soluble fraction (SF) is 2.5 to 11 dl/g, and wherein the amount of crystalline fraction (CF) and the amount of soluble fraction (SF) are determined in 1,2,4-trichlorobenzene at 40° C.

In a preferred embodiment, the heterophasic polypropylene copolymer of the invention has an $MFR_2$ of 0.1 to 20 g/10 min (ISO 1133 at 230° C. with a loading of 2.16 kg) and a melting point (Tm) of 157 to 164° C. (measured by DSC according to ISO 11357) wherein the heterophasic polypropylene copolymer comprises at least the following components:

(A) 55.0 to 80.0 wt % of a crystalline fraction (CF) having a comonomer content of 0 to 3.0 wt %; and (B) 20.0 to 45.0 wt % of a soluble fraction (SF) having a comonomer content of 12 to 40 wt %;

wherein the intrinsic viscosity (IV) (in decalin at 135° C.) of the crystalline fraction (CF) is 1.5 to 5.0 dl/g;

wherein the intrinsic viscosity (IV) (in decalin at 135° C.) of the soluble fraction (SF) is 4.5 to 11 dl/g, and wherein the amount of crystalline fraction (CF) and the amount of soluble fraction (SF) are determined in 1,2,4-trichlorobenzene at 40° C.

In a preferred embodiment, the heterophasic polypropylene copolymer of the invention has an $MFR_2$ of 0.05 to 2.5 g/10 min (ISO 1133 at 230° C. with a loading of 2.16 kg) and a melting point (Tm) of 156 to 163° C., wherein the heterophasic polypropylene copolymer comprises at least the following components:

(A) 75.0 to 95.0 wt % of a crystalline fraction (CF) having a comonomer content of 0 to 2.0 wt %; and (B) 5.0 to 25.0 wt % of a soluble fraction (SF) having a comonomer content of 12 to 45 wt %;

wherein the intrinsic viscosity (IV) (in decalin at 135° C.) of the soluble fraction (SF) is 2.5 to 10 dlL/g, and wherein the amount of crystalline fraction (CF) and the amount of soluble fraction (SF) are determined in 1,2,4-trichlorobenzene at 40° C.

The nature of the rubber component (i.e. the SF soluble fraction) can be tailored to achieve surprisingly high molecular weight. Also, we show that the heterophasic copolymers of the invention possess a very high melting point (Tm) of 156 to 164° C., preferably 156 to 163° C., more preferably 156 to 162° C., such as 157 to 162° C., still more preferably 158 to 162° C.

The heterophasic propylene copolymers (HECOs) of the invention effectively comprise a polymer matrix (M) being a propylene homopolymer (hPP) or a random propylene-ethylene or propylene-ethylene-1-butene copolymer (rPP) or a combination of the two, in which a mostly amorphous copolymer (B), like a propylene-ethylene copolymer (EP), is dispersed (i.e. rubber phase, such as EPR).

Thus, the polypropylene matrix (M) contains (finely) dispersed inclusions being not part of the matrix and said inclusions contain the amorphous copolymer (B). The matrix component (M) can be considered the crystalline fraction (or insoluble fraction). The amorphous or rubber fraction can be considered the soluble fraction (SF).

The term "heterophasic polypropylene copolymer" used herein denotes copolymers comprising a matrix fraction, being a polypropylene homopolymer or a propylene copolymer and a predominantly amorphous copolymer (B) dispersed in said matrix, as defined in more detail below.

Matrix (M)/Crystalline Fraction (CF)

The embodiments which follow apply equally to the matrix component/crystalline fraction. The crystalline fraction is that part of the heterophasic polypropylene copolymer which is insoluble in 1,2,4-trichlorobenzene at 40° C.

The matrix (M)/crystalline fraction of the heterophasic polypropylene copolymer is preferably a propylene homopolymer or a semicrystalline propylene-ethylene or propylene-butene copolymer or a propylene-ethylene butene copolymer or a combination thereof. The term "semicrystalline" indicates that the copolymer has a well-defined melting point and a heat of fusion higher than 50 J/g.

The comonomer content in this component is low, i.e. 2.0 wt % or less, more preferably there is less than 1.0 wt % comonomer in the matrix component/crystalline fraction, such as 0.5 wt % or less. Ideally, the matrix component/crystalline fraction is a propylene homopolymer. If a comonomer is present, this is preferably ethylene.

In one embodiment the matrix (M)/crystalline fraction comprises the homopolymer of propylene as defined above or below, preferably consists of the homopolymer of propylene as defined above or below.

The polypropylene homopolymer may comprise or consist of a single polypropylene homopolymer fraction (=unimodal), but may also comprise a mixture of different polypropylene homopolymer fractions.

In cases where the polypropylene homopolymer comprises different fractions, the polypropylene homopolymer is understood to be bi- or multimodal. These fractions may have different average molecular weight or different molecular weight distribution.

It is preferred that the polypropylene homopolymer can be bimodal or multimodal in view of molecular weight or molecular weight distribution.

It is alternatively preferred that the polypropylene homopolymer can be unimodal in view of average molecular weight and/or molecular weight distribution.

Thus in one embodiment or the present invention the matrix (M)/crystalline fraction is unimodal, whereas in another embodiment the matrix (M)/crystalline fraction is bimodal and consists of two propylene homopolymer fractions (hPP-1) and (hPP-2).

In a further embodiment, the matrix (M)/crystalline fraction is bimodal and consists of one homopolymer fraction and one semicrystalline copolymer fraction.

The matrix component is ideally an isotactic polypropylene matrix component. The matrix component may consist of a single propylene homopolymer but may also comprise a mixture of different propylene homopolymers. Ideally, however a single propylene homopolymer is present.

The matrix component may have a melting point (Tm) of 156 to 162° C., preferably 158 to 161° C.

The $MFR_2$ of the matrix component/crystalline fraction (A) may be in the range of 0.01 to 15 g/10 min, such 0.1 to 10 g/10 min, preferably 0.1 to 4.0 g/10 min.

In one embodiment, there is 80.0 to 95.0 wt % of the component (A) in the heterophasic polypropylene copolymer, preferably 85.0 to 95.0 wt % of component (A).

In a second embodiment, there is 65.0 to 85.0 wt % of component (A), preferably 70.0 to 80.0 wt % of component (A).

It will be appreciated therefore that matrix (M)/crystalline fraction can be considered to be the component made in the first stage of the polymerisation process described in detail herein, or it can be regarded as the component insoluble in 1,2,4-trichlorobenzene (1,2,4-TCB).

It therefore follows that amorphous fraction (B) can be considered to be the component made in the second stage of the polymerisation process described in detail herein, or it can be regarded as the component soluble in 1,2,4-trichlorobenzene (1,2,4-TCB).

Amorphous Propylene Copolymer/Soluble Fraction:

The second component of the heterophasic polypropylene copolymer is a propylene copolymer fraction (B), which is preferably an amorphous copolymer of propylene and ethylene. The amorphous propylene copolymer may also be amorphous propylene-ethylene-1-butene copolymer.

Thus, the second component is preferably an elastomeric copolymer, being dispersed in said matrix (M) (i.e. dispersed phase).

As stated above, the terms "amorphous (propylene-ethylene) copolymer", "dispersed phase" and "rubber phase" denote the same, i.e. are interchangeable in view of this invention.

The amorphous propylene-ethylene copolymer (B) is fully soluble in xylene at room temperature.

The amorphous propylene-ethylene copolymer (B) is fully soluble in in 1,2,4-trichlorobenzene (1,2,4-TCB).

Like the propylene polymer matrix, the dispersed phase can be unimodal or multimodal, like bimodal.

In one embodiment, the dispersed phase is unimodal. More particularly, the dispersed phase is preferably unimodal with respect to the intrinsic viscosity and/or the comonomer distribution.

Concerning the definition of unimodal and multimodal, like bimodal, it is referred to the definition above.

Preferably, the unimodal dispersed phase is made in one reaction stage, more preferably in a gas phase reactor and comprises, such as consists of, one propylene-ethylene copolymer fraction.

In one embodiment, component (B) forms 5.0 to 25.0 wt % of the polymer, preferably 5.0 to 20.0 wt %, more preferably 5.0 to 15.0 wt %.

In a second embodiment component (B) forms 35.0 to 15.0 wt % of the polymer, preferably 30.0 to 20.0 wt %.

The comonomer content, such as ethylene content, of the amorphous fraction/soluble fraction may be between 12 and 40 wt %, preferably 18 and 40 wt %, such as 20 to 40 wt %.

The soluble fraction is generally a random copolymer. It is preferably dispersed within the matrix and that is best achieved by producing the EPR phase after the matrix in a multistage polymerisation reaction as defined below.

The $MFR_2$ of the soluble fraction is preferably more than 0.01 g/10 min, preferably more than 0.05 g/10 min, more preferably more than 0.1 g/10 min, especially more than 0.2 g/10 min. The upper limit or the $MFR_2$ of the soluble fraction is preferably 10 g/10 min.

If the MFR values of a component cannot be measured directly, they can be calculated from intrinsic viscosity measurements based on the correlations defined in C. Grein, M. Gahleitner, B. Knogler & S. Nestelberger, *Melt viscosity effects in Ethylene-Propylene Copolymers*, Rheol. Acta, 46 (2007) 1083-1089. From the MFR of the total polymer and the MFR of the SF fraction, the MFR of the matrix component of an impact copolymer can be calculated using a logarithmic mixing rule, i.e. using the following equation $$MFR(Total) = 10^{(1-w(SF))\log 10(MFR(Matrix)) + w(SF)\log 10(MFR(SF))}$$

with w(SF) being the weight fraction of the SF phase (B).

In all embodiments of the invention, the intrinsic viscosity of the soluble fraction IV(SF) is preferably at least 2.5 dl/g, such as at least 3.0 dl/g. The upper limit may be 11 dl/g, such as 10 dl/g. It is however beneficial if the IV(SF) is at least 3.5 dl/g, more preferably at least 4.0 dl/g, such as 4.5 to 10 dl/g, especially 5.0 to 9.0 dl/g, most especially 5.5 to 8.0 dl/g, wherein the intrinsic viscosity (SF) is measured in decalin at 135° C.

Final Heterophasic Propylene Copolymer

The heterophasic propylene copolymer according to the present invention may, as described below, be produced by sequential polymerization. Preferably, in at least one step the propylene homopolymer matrix is produced, and in a subsequent step the amorphous propylene-ethylene copolymer (B) is produced in the presence of the propylene homopolymer.

In order to characterize the matrix phase and the amorphous phase of a heterophasic propylene copolymer several methods are known.

The crystalline fraction and a soluble fraction may be separated with the CRYSTEX QC method using 1,2,4-trichlorobenzene (TCB) as solvent. This method is described below in the measurement methods section. In this method, a crystalline fraction (CF) and a soluble fraction (SF) are separated from each other. The crystalline fraction (CF) largely corresponds to the matrix phase, while the soluble fraction (SF) largely corresponds to the elastomeric phase.

It is preferred if the heterophasic propylene copolymer has a melting point (Tm) of 156 to 162° C., preferably 157 to 161° C., especially 158 to 161° C.

It is preferred if the heterophasic propylene copolymer has an $MFR_2$ of 0.1 to 2.5 g/10 min, preferably 0.2 to 2.5 g/10 min.

The final heterophasic polypropylene copolymer may have an $MFR_2$ of 0.2 to 2.0 g/10 min, such as 0.4 to 1.5 g/10 min.

The final heterophasic polypropylene copolymer may have an $MFR_2$ of 0.2 to 15 g/10 min, such as 0.2 to 1.5

It is preferred if the heterophasic propylene copolymer has a xylene soluble fraction of 5.0 to 30 wt %.

In one embodiment, it is preferred if the heterophasic propylene copolymer comprises 80.0 to 95.0 wt % of a crystalline fraction (CF).

In one embodiment, it is preferred if the heterophasic propylene copolymer comprises 70.0 to 80.0 wt % of a crystalline fraction (CF).

In one embodiment, it is preferred if the heterophasic propylene copolymer comprises 5.0 to 20.0 wt % of a soluble fraction (SF).

In one embodiment, it is preferred if the heterophasic propylene copolymer comprises 30.0 to 20.0 wt % of a soluble fraction (SF).

It is preferred if the heterophasic propylene copolymer has an Mw/Mn of 1.0 to 4.0.

The final heterophasic polypropylene copolymer may have an IV of 1.5 to 5.0 dl/g, such as 2.0 to 5.0 dl/g measured in decalin at 135° C.

The final heterophasic heterophasic polypropylene copolymer may have a flex modulus of 800 MPa or more, preferably 800 to 1800 MPa, such as 1200 to 1800 MPa (ISO178).

The final heterophasic polypropylene copolymer may have a notched charpy impact strength (23° C.) of at least 40.0 kJ/m$^2$, such as 42.0 to 70 kJ/m$^2$.

The final heterophasic polypropylene copolymer may have a notched charpy impact strength (−20° C.) of at least 4.0 kJ/m$^2$, preferably 4.0 to 12 kJ/m$^2$, such as 4.0 to 7.0 kJ/m$^2$.

The final heterophasic polypropylene copolymer may have a C2 content of 2.5 to 5.0 wt %, such as 3.0 to 4.0 wt %.

The 2,1-regio error content in the heterophasic polypropylene copolymer may be 0.01 to 0.6 mol %, preferably 0.05 to 0.4 mol %.

Metallocene

Heterophasic polypropylenes of the invention can be prepared using metallocene catalysis. The metallocene complexes in the catalysts may be asymmetrical. Asymmetrical means simply that the two ligands forming the metallocene are different.

The metallocene catalyst complexes suitable for use in the preparation of the heterophasic polypropylenes of the invention are preferably chiral, racemic bridged bisindenyl C1-symmetric metallocenes in their anti-configuration.

Although the complexes of the invention are formally C1-symmetric, the complexes ideally retain a pseudo-C2-symmetry since they maintain C2-symmetry in close proximity of the metal center although not at the ligand periphery. By nature of their chemistry both anti and syn enantiomer pairs (in case of C1-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the scheme below.

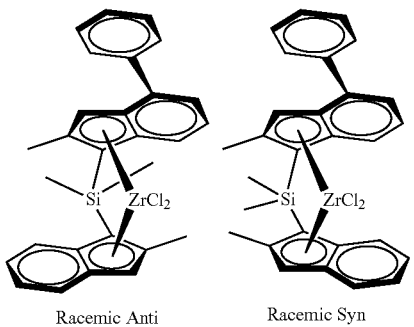

Racemic Anti    Racemic Syn

Formula (I), and any sub formulae, are intended to cover both syn- and anti-configurations. Preferred metallocene catalyst complexes are in the anti-configuration.

The metallocene complexes of the invention are preferably employed as the racemic-anti isomers. Ideally, therefore at least 95% mol, such as at least 98% mol, especially at least 99% mol of the metallocene catalyst complex is in the racemic-anti isomeric form.

Metallocene Complexes

Metallocene complexes according to the invention are of formula (I):

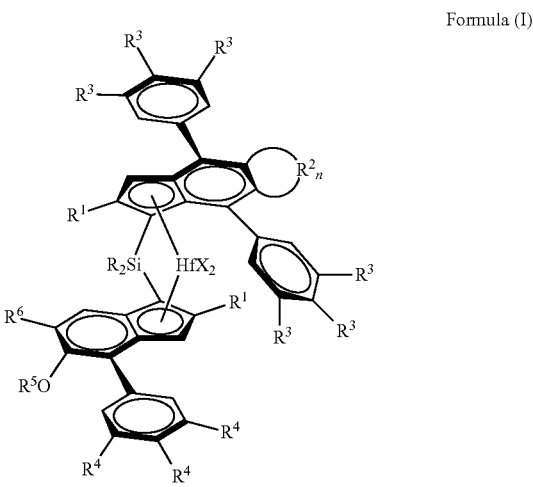

Formula (I)

In a complex of formula (I) each X is a sigma ligand. Most preferably, each X is independently a hydrogen atom, a halogen atom, $C_{1-6}$ alkoxy group or an R' group, where R' is a $C_{1-6}$ alkyl, phenyl or benzyl group. Most preferably, X is chlorine, benzyl or a methyl group. Preferably, both X groups are the same. The most preferred options are two chlorides, two methyl or two benzyl groups, especially two chlorides.

In the bridging group $R_2Si$— at least one R is methyl or ethyl, and the other R is selected from methyl, ethyl, n-propyl, isopropyl, n-butyl or isobutyl, pentyl, hexyl, cyclohexyl and phenyl.

In a preferred formula $R_2Si$— represents $Me_2Si$—, $Et_2Si$— or (cyclohexyl)Me-Si—. Most preferably the bridge is —$Si(CH_3)_2$ or $Et_2Si$—.

Each $R^1$ independently is the same or can be different and are a $CH_2$—$R^7$ group, with $R^7$ being H or linear or branched $C_{1-6}$-alkyl group, like methyl, ethyl, n-propyl, i-propyl, n-butyl, i-butyl, sec.-butyl and tert.-butyl, $C_{3-8}$ cycloalkyl group (e.g. cyclohexyl), or $C_{6-10}$ aryl group (preferably phenyl).

Preferably, both $R^1$ groups are the same and are a $CH_2$—$R^7$ group, with $R^7$ being H or linear or branched $C_{1-4}$-alkyl group, more preferably, both $R^1$ groups are the same and are a $CH_2$—$R^7$ group, with $R^7$ being H or linear or branched $C_{1-3}$-alkyl group. Most preferably, both $R^1$ groups are both methyl.

Each $R^2$ is independently a —CH═, —CY═, —$CH_2$—, —CHY— or —$CY_2$— group, wherein Y is a $C_{1-10}$ hydrocarbyl group, preferably a $C_{1-4}$ hydrocarbyl group and where n is 2-6, preferably 3-4. Ideally $R^2$ together with the atoms of the phenyl ring forms a five membered ring. It is preferred if $R^2$ is —$CH_2$— and n is 3.

Each substituent $R^3$ and $R^4$ are independently the same or can be different and are hydrogen, a linear or branched $C_{1-6}$-alkyl group, a $C_{7-20}$ arylalkyl, $C_{7-20}$ alkylaryl group, $C_{6-20}$ aryl group or an —OY group, wherein Y is a is a C1-6 hydrocarbyl group. It is required that either:

(A) at least one $R^3$ per phenyl group and at least one $R^4$ is not hydrogen, and wherein at least one $R^3$ per phenyl group and at least one $R^4$ is hydrogen; or (B) one $R^3$ is an —OY group, wherein Y is a is a $C_{1-6}$ hydrocarbyl group in 4 position of each phenyl group and the two other $R^3$ groups are tert-butyl groups; and/or (C) one $R^4$ is an —OY group, wherein Y is a is a $C_{1-6}$ hydrocarbyl group in 4-position of the phenyl ring and the two other $R^4$ groups are tert-butyl groups.

The phenyl rings can therefore be mono, bis or trisubstituted.

More preferably, $R^3$ and $R^4$ are hydrogen or a linear or branched $C_{1-4}$ alkyl group or an —OY group, wherein Y is a $C_{1-4}$ hydrocarbyl group. Even more preferably, each $R^3$ and $R^4$ are independently hydrogen, methyl, ethyl, isopropyl, tert-butyl or methoxy, especially hydrogen, methyl or tert-butyl, wherein at least one $R^3$ per phenyl group and at least one $R^4$ is not hydrogen and wherein at least one $R^3$ per phenyl group and at least one $R^4$ is hydrogen; or at least one $R^3$ is a methoxy group in the 4 position of each phenyl group and the two other $R^3$ groups are tert-butyl groups; and/or at least one $R^4$ is a methoxy group in the 4-position of the phenyl ring and the two other $R^4$ are tert-butyl groups.

Thus, in one embodiment, one or two $R^3$ per phenyl group are not hydrogen and one or two $R^3$ groups are hydrogen.

If there are two non-hydrogen $R^3$ groups per phenyl group then the $R^3$ group representing hydrogen is preferably at the 4-position of the ring. If there are two $R^3$ groups representing hydrogen then the non-hydrogen $R^3$ group is preferably present at the 4-position of the ring.

Most preferably the two $R^3$ groups are the same. A preferred structure is 3',5'-di-methyl or 4'-tert-butyl for both phenyl groups substituted by $R^3$ groups. Alternatively, the structure is 3,5-di-tert-butyl-4-methoxyphenyl.

For the indenyl moiety, in one embodiment, one or two $R^4$ groups on the phenyl group are not hydrogen. More preferably two $R^4$ groups are not hydrogen. If there are two non-hydrogen $R^4$ groups then the $R^4$ representing hydrogen is preferably at the 4-position of the ring. If there are two $R^4$ groups representing hydrogen then the non-hydrogen $R^4$ group is preferably present at the 4-position of the ring.

Most preferably the two $R^4$ are the same like 3',5'-di-methyl or 3',5'-di-tert-butyl. Another option is 3',5'-di-tert-butyl-4-methoxyphenyl.

$R^5$ is a linear or branched $C_{1-6}$-alkyl group such as methyl, ethyl, n-propyl, i-propyl, n-butyl, i-butyl, sec-butyl and tert-butyl, $C_{7-20}$ arylalkyl, $C_{7-20}$ alkylaryl group or $C_{6-20}$ aryl group.

$R^5$ is a preferably a linear or branched C1-6 alkyl group or $C_{6-20}$ aryl group, more preferably a linear $C_{1-4}$ alkyl group, even more preferably a C1 or C2 alkyl group and most preferably methyl.

$R^6$ is a $C(R^8)_3$ group, with $R^8$ being a linear or branched $C_{1-6}$ alkyl group.

Preferably each $R^8$ are the same or different with $R^8$ being a linear or branched $C_{1-4}$-alkyl group, more preferably with $R^8$ being the same and being a C1 or C2-alkyl group. Most preferably, all $R^8$ groups are methyl.

In a preferred embodiment, the invention provides a metallocene complex of formula (II)

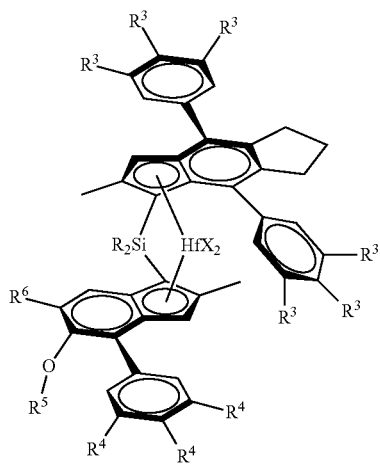

(II)

each X is a sigma-ligand selected from chloro, benzyl and $C_{1-6}$-alkyl;

$R_2Si$— is $Me_2Si$ or $Et_2Si$—;

each $R^3$ and $R^4$ are independently the same or can be different and are hydrogen, a linear or branched $C_{1-6}$-alkyl group or —OY group where Y is a $C_{1-6}$ alkyl group; wherein (A) at least one $R^3$ per phenyl group and at least one $R^4$ is not hydrogen, and at least one $R^3$ per phenyl group and at least one $R^4$ is hydrogen; or (B) at least one $R^3$ is an —OY group, wherein Y is a is a $C_{1-6}$ hydrocarbyl group, in the 4 position of each phenyl ring and the two other $R^3$ groups are tert-butyl groups; and/or (C) at least one $R^4$ is an —OY group, wherein Y is a is a $C_{1-6}$ hydrocarbyl group in the 4-position of the phenyl ring and the two other $R^4$ groups are tert-butyl groups;

$R^5$ is a linear or branched $C_{1-6}$-alkyl group;

$R^6$ is a —$C(R^8)_3$ group, with $R^8$ being a linear or branched C1 or C2 alkyl group.

More preferably, the metallocene complex of the invention is one of formula (III)

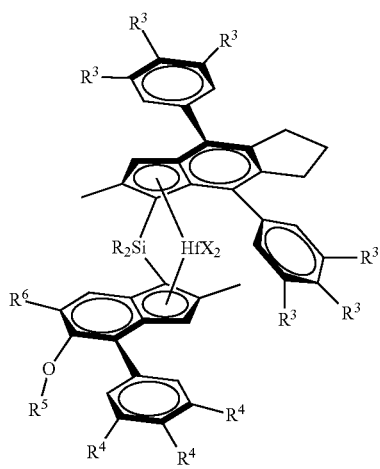

(III)

each X is the same and is a sigma-ligand selected from chloro, benzyl and $C_{1-6}$ alkyl;

$R_2Si$— is $Me_2Si$ or $Et_2Si$—;

each non-hydrogen $R^3$ is the same and each non-hydrogen $R^4$ is the same;

$R^3$ is hydrogen, a linear or branched $C_{1-6}$-alkyl group;

$R^4$ is hydrogen, a linear or branched $C_{1-6}$-alkyl group;

wherein at least one $R^3$ per phenyl group and at least one $R^4$ is not hydrogen, and wherein at least one $R^3$ per phenyl group and at least one $R^4$ is hydrogen, $R^5$ is a linear or branched $C_{1-4}$-alkyl group; and $R^6$ is a —$C(R^8)_3$ group, with $R^8$ being a linear or branched C1 or C2 alkyl group.

In a further preferred embodiment, the invention provides a metallocene complex of formula (IVa) to (IVd)

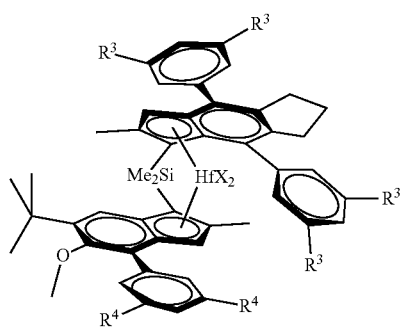

Formula (IVa)

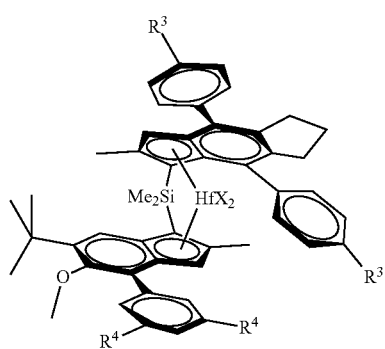

Formula (IVb)

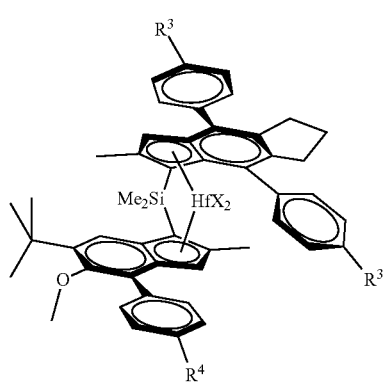

Formula (IVc)

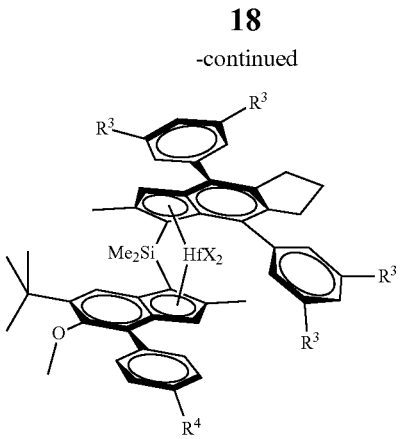

Formula (IVd)

wherein each X is the same and is chloro, benzyl or $C_{1-6}$-alkyl, preferably chloro, benzyl or methyl;

each $R^3$ and $R^4$ are independently the same or can be different and are a linear or branched $C_{1-6}$-alkyl group.

Preferably the $R^3$ groups are the same. Preferably the $R^4$ groups are the same. Specific metallocene complexes of the invention include:

rac-anti-dimethylsilanediyl[2-methyl-4,8-bis-(3',5'-dimethylphenyl)-1,5,6,7-tetrahydro-s-indacen-1-yl] [2-methyl-4-(3',5'-dimethylphenyl)-5-methoxy-6-tert-butylinden-1-yl] Hafnium dichloride (MC-1)

rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl] Hafnium dichloride (MC-2)

rac-anti-dimethylsilanediyl[2-methyl-4,8-bis-(4'-tert-butylphenyl)-1,5,6,7-tetrahydro-s-indacen-1-yl][2-methyl-4-(4'-tert-butylphenyl)-5-methoxy-6-tert-butylinden-1-yl] Hafnium dichloride (MC-3)

rac-anti-dimethylsilanediyl[2-methyl-4,8-bis-(3',5'-dimethylphenyl)-1,5,6,7-tetrahydro-s-indacen-1-yl][2-methyl-4-(3',5'-di-tert-butyl-phenyl)-5-methoxy-6-tert-butylinden-1-yl] Hafnium dichloride (MC-4)

rac-anti-dimethylsilanediyl[2-methyl-4,8-bis-(3',5'-dimethylphenyl)-1,5,6,7-tetrahydro-s-indacen-1-yl][2-methyl-4-(4'-tert-butylphenyl)-5-methoxy-6-tert-butylinden-1-yl] Hafnium dichloride (MC-5)

or their corresponding dimethyl analogues.

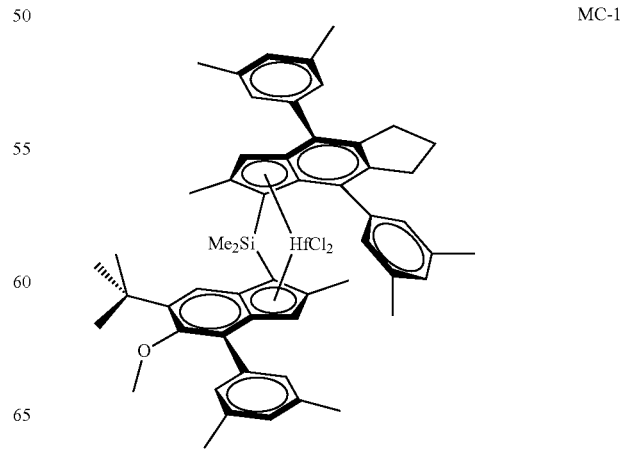

MC-1

MC-2

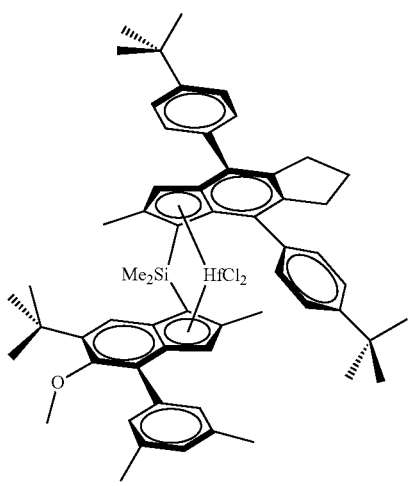

MC-3

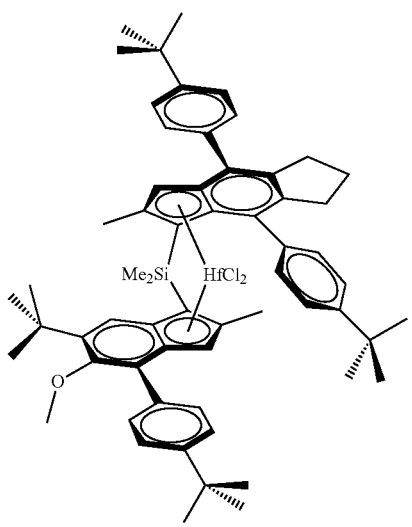

MC-4

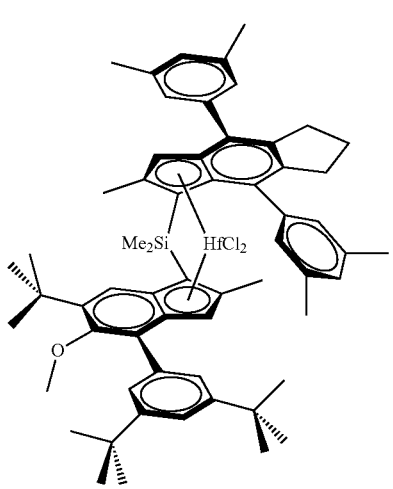

MC-5

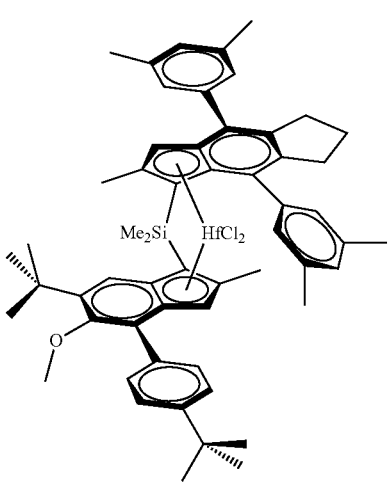

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the catalysts of the invention can be synthesised by any process and the skilled organic chemist would be able to devise various synthetic protocols for the manufacture of the necessary ligand materials. WO2007/116034 discloses the necessary chemistry and is herein incorporated by reference. Synthetic protocols can also generally be found in WO2002/02576, WO2011/135004, WO2012/084961, WO2012/001052, WO2011/076780 and WO2015/158790. The examples section also provides the skilled person with sufficient direction.

Cocatalyst

To form an active catalytic species it is normally necessary to employ a cocatalyst as is well known in the art.

According to the present invention a cocatalyst system comprising a boron containing cocatalyst and/or an aluminoxane cocatalyst is used in combination with the above defined metallocene catalyst complex.

The aluminoxane cocatalyst can be one of formula (X):

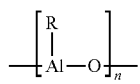

(X)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_{3-10}$ cycloalkyl, $C_7$-$C_{12}$ arylalkyl or alkylaryl and/or phenyl or naphthyl, and where Y can be hydrogen, halogen, preferably chlorine or bromine, or C1-C10 alkoxy, preferably methoxy or ethoxy.

The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used instead of the aluminoxane cocatalyst or the aluminoxane cocatalyst can be used in combination with a boron containing cocatalyst.

It will be appreciated by the skilled man that where boron based cocatalysts are employed, it is normal to pre-alkylate the complex by reaction thereof with an aluminium alkyl compound, such as TIBA. This procedure is well known and any suitable aluminium alkyl, e.g. $Al(C_{1-6}\text{-alkyl})_3$. can be used.

Preferred aluminium alkyl compounds are triethylaluminium, tri-isobutylaluminium, tri-isohexylaluminium, tri-n-octylaluminium and tri-isooctylaluminium.

Alternatively, when a borate cocatalyst is used, the metallocene catalyst complex is in its alkylated version, that is for example a dimethyl or dibenzyl metallocene catalyst complex can be used.

Boron based cocatalysts of interest include those of formula (Z)

$$BY^3 \tag{Z}$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are trifluoromethyl, unsaturated groups such as haloaryl like p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl) borane, tris(2,4,6-trifluorophenyl)borane, tris(pentafluorophenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate anion. Such ionic cocatalysts preferably contain a non-coordinating anion such as tetrakis (pentafluorophenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:
tributylammoniumtetra(pentafluorophenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl) borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(pentafluorophenyl)borate,
triethylphosphoniumtetrakis(pentafluorophenyl)borate,
diphenylphosphoniumtetrakis(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate and N,N-dimethylbenzylammoniumtetrakis(pentafluorophenyl) borate.

In particular, triphenylcarbeniumtetrakis(pentafluorophenyl)borate and N,N-dimethylaniliniumtetrakis(pentafluorophenyl)borate are especially preferred.

Thus the use of $Ph_3CB(PhF_5)_4$ and analogues therefore are especially favoured.

According to the present invention, the preferred cocatalysts are alumoxanes, more preferably methylalumoxanes, combinations of alumoxanes with Al-alkyls, boron or borate cocatalysts and combination of alumoxanes with boron-based cocatalysts.

According to the most preferred embodiment of present invention, the preferred cocatalysts are alumoxanes, most preferably methylalumoxanes in combination with a borate cocatalyst such as N,N-dimethylammonium-tetrakispentafluorophenylborate and $Ph_3CB(PhF_5)_4$. The combination of methylalumoxane and a tritylborate is especially preferred.

Suitable amounts of cocatalyst will be well known to the skilled man.

The molar ratio of feed amounts of boron to the metal ion of the metallocene may be in the range 0.1:1 to 10:1 mol/mol, preferably 0.3:1 to 7:1, especially 0.3:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst may contain from 10 to 100 μmol of the metal ion of the metallocene per gram of silica, and 5 to 10 mmol of Al per gram of silica.

Catalyst Manufacture

The metallocene catalyst complex of the present invention can be used in combination with a suitable cocatalyst as a catalyst for the polymerization of propylene, e.g. in a solvent such as toluene or an aliphatic hydrocarbon, (i.e. for polymerization in solution), as it is well known in the art.

The catalyst of the invention can be used in supported or unsupported form. Preferably, the catalyst system of the invention is used in supported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst. Especially preferably the support is a porous material so that the complex may be loaded into the pores of the support, e.g. using a process analogous to those described in WO94/14856, WO95/12622 and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co.

Supports can be optionally calcined prior to the use in catalyst preparation in order to reach optimal silanol group content.

The use of these supports is routine in the art.

In an alternative embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt previously dissolved in an aromatic solvent, or can be prepared by sequentially adding the dissolved catalyst components to the polymerization medium.

In one embodiment, no external carrier is used but the catalyst is still presented in solid particulate form. Thus, no external support material, such as inert organic or inorganic carrier, for example silica as described above is employed, but the solid catalyst is prepared using an emulsion-solidification method. Full disclosure of said method is described in WO2003/051934, which is herein incorporated by reference.

In one embodiment, the preparation of the catalyst system according to the present invention comprises the steps of:
a) reacting the silica support with aluminoxane cocatalyst in a suitable hydrocarbon solvent, such as toluene with optional subsequent washings and drying, to obtain aluminoxane cocatalyst treated support,
b) reacting metallocene complex of formula (I) with aluminoxane cocatalyst in a suitable hydrocarbon solvent, such as toluene,
c) adding borate cocatalyst to the solution obtained in step b) to obtain a solution of metallocene complex of formula (I), borate cocatalyst and aluminoxane cocatalyst whereby the borate cocatalyst is added in an amount that a boron/hafnium molar ratio of feed amounts in the range of 0.1:1 to 10:1 is reached,
d) adding the solution obtained in step c) to the aluminoxane cocatalyst treated support obtained in step a) wherein the amount of aluminoxane cocatalyst added in step a) is 75.0 to 97.0 wt % of the total amount of aluminoxane cocatalyst and the amount of aluminoxane cocatalyst added in step b) is 3.0 to 25.0 wt % of the total amount of aluminoxane cocatalyst and
e) optionally drying the so obtained supported catalyst system.

Polymerization

The heterophasic propylene copolymers are prepared in a multistage polymerization using conventional polymerization techniques, e.g. slurry or bulk polymerization and at least one gas phase reactor. In case of propylene polymerization for slurry reactors, the reaction temperature will generally be in the range 60 to 110° C. (e.g. 60 to 90° C.), the reactor pressure will generally be in the range 5 to 80 bar (e.g. 20 to 60 bar), and the residence time will generally be in the range 0.1 to 5 hours (e.g. 0.3 to 2 hours). The monomer is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0.5 to 8 hours (e.g. 0.5 to 4 hours). The gas used will be the monomer optionally as mixture with a non-reactive gas such as nitrogen or propane. In addition to actual polymerization steps and reactors, the process can contain any additional polymerization steps, like prepolymerization step, and any further after reactor handling steps as known in the art. Generally the quantity of catalyst used will depend upon the nature of the catalyst, the reactor types and conditions and the properties desired for the polymer product. As is well known in the art hydrogen can be used for controlling the molecular weight of the polymer.

Polymerization in the method of the invention may be effected in two or more, e.g. 2 polymerization reactors. The process may also involve a prepolymerisation reaction. This prepolymerisation step is a conventional step used routinely in polymer synthesis and is to be distinguished from the catalyst prepolymerisation step discussed above.

Ideally, the process of the invention employs two main reactors, a first reactor operating in bulk, and a gas phase reactor. The process may also utilise a prepolymerisation step. Where a prepolymerisation step is used, any weight percentage of product produced in such a step is considered part of component (A) and should be taken into account when identifying the weight percentage of component (A).

The inventive process preferably forms a first component (A) which can be a homopolymer and is subsequently combined with an ethylene propylene copolymeric amorphous fraction (B) to form the heterophasic copolymer of the invention. Component (B) is preferably formed second and is preferably formed in the gas phase.

Ideally therefore a propylene homopolymer matrix component (A) is formed in a bulk step and a propylene ethylene copolymer amorphous phase (B) is formed in a gas phase step.

A preferred polymerisation process involves polymerising:
(I) propylene and optionally ethylene so as to form a propylene homopolymer or propylene ethylene copolymer component (A) having up to 2 wt % ethylene; and subsequently polymerising
(II) propylene and ethylene, preferably in the gas phase, so as to form an ethylene propylene rubber component (B) dispersed in the matrix;
wherein both steps (I) and (II) take place in the presence of the catalyst as defined herein.

Applications

The heterophasic polypropylene copolymer of the invention can be used in the manufacture of an article such as a flexible pipe/tube, profile, cable insulation, sheet or film. These articles are useful in the medical and general packaging area but also for technical purposes like electrical power cables or geomembranes. Alternatively, the heterophasic polypropylene copolymer can be used in impact modification of a composition for injection moulding of articles, such as for technical applications in the automotive area.

For impact modification, the inventive heterophasic polypropylene copolymer may be blended to another polypropylene copolymer. Thus, the invention also relates to polymer blends comprising the heterophasic polypropylene copolymers of the invention.

The polymers of the invention are useful in the manufacture of a variety of end articles such as films (cast, blown or BOPP films), moulded articles (e.g. injection moulded, blow moulded, rotomoulded articles), extrusion coatings and so on. Preferably, articles comprising the films of the invention are used in packaging. Packaging of interest include heavy duty sacks, hygiene films, lamination films, and soft packaging films.

The invention will now be illustrated by reference to the following non-limiting examples.

Analytical Tests

Measurement Methods:

Al, Zr and Hf Determination (ICP-Method)

In a glovebox, an aliquot of the catalyst (ca. 40 mg) was weighed into glass weighting boat using analytical balance. The sample was then allowed to be exposed to air overnight while being placed in a steel secondary container equipped with an air intake. Then 5 mL of concentrated (65%) nitric acid was used to rinse the content of the boat into the Xpress microwave oven vessel (20 mL). A sample was then subjected to a microwave-assisted digestion using MARS 6 laboratory microwave unit over 35 minutes at 150° C. The digested sample was allowed to cool down for at least 4 h and then was transferred into a glass volumetric glass flask of 100 mL volume. Standard solutions containing 1000 mg/L Y and Rh (0.4 mL) were added. The flask was then filled up with distilled water and shaken well. The solution was filtered through 0.45 μm Nylon syringe filters and then subjected to analysis using Thermo iCAP 6300 ICP-OES and iTEVA software.

The instrument was calibrated for Al, B, Hf, Mg, Ti and Zr using a blank (a solution of 5% HNO3) and six standards of 0.005 mg/L, 0.01 mg/L, 0.1 mg/L, 1 mg/L, 10 mg/L and 100 mg/L of Al, B, Hf, Mg, Ti and Zr in solutions of 5% HNO3 in distilled water. However, not every calibration point was used for each wavelength. Each calibration solution contained 4 mg/L of Y and Rh standards. Al 394.401 nm was calibrated using the following calibration points: blank, 0.1 mg/L, 1 mg/L, 10 mg/L and 100 mg/L. Al 167.079 nm was calibrated as Al 394.401 nm excluding 100 mg/L and Zr 339.198 nm using the standards of blank, 0.01 mg/L, 0.1 mg/L, 1 mg/L, 10 mg/L and 100 mg/L. Curvilinear fitting and 1/concentration weighting was used for the calibration curves. Hf 264.141 nm was calibrated using the standards of blank, 0.01 mg/L, 0.1 mg/L, 1 mg/L, 10 mg/L and 100 mg/L.

Immediately before analysis the calibration was verified and adjusted (instrument reslope function) using the blank and a 10 mg/L Al, B, Hf, Mg, Ti and Zr standard which had 4 mg/L Y and Rh. A quality control sample (QC: 1 mg/L Al, Au, Be, Hg & Se; 2 mg/L Hf & Zr, 2.5 mg/L As, B, Cd, Co, Cr, Mo, Ni, P, Sb, Sn & V; 4 mg/L Rh & Y; 5 mg/L Ca, K, Mg, Mn, Na & Ti; 10 mg/L Cu, Pb and Zn; 25 mg/L Fe and 37.5 mg/L Ca in a solution of 5% HNO3 in distilled water) was run to confirm the reslope for Al, B, Hf, Mg, Ti and Zr. The QC sample was also run at the end of a scheduled analysis set.

The content for Zr was monitored using Zr 339.198 nm {99} line. Content of Hf was monitored using line Hf 264.141 nm {128}. The content of aluminium was monitored via the 167.079 nm {502} line, when Al concentration in test portion was under 2 wt % and via the 394.401 nm {85} line for Al concentrations above 2 wt %. Y 371.030 nm {91} was used as internal standard for Zr 339.198 nm and Al 394.401 nm and Y 224.306 nm {450} for Al 167.079 nm.

The reported values were back calculated to the original catalyst sample using the original mass of the catalyst aliquot and the dilution volume.

GPC: Molecular Weight Averages, Molecular Weight Distribution, and Polydispersity Index (Mn, Mw, Mw/Mn)

Molecular weight averages (Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19\times10^{-3}\text{ mL/g, }\alpha_{PS}=0.655$$

$$K_{PE}=39\times10^{-3}\text{ mL/g, }\alpha_{PE}=0.725$$

$$K_{PP}=19\times10^{-3}\text{ mL/g, }\alpha_{PP}=0.725$$

A third order polynomial fit was used to fit the calibration data.

All samples were prepared in the concentration range of 0.5-1 mg/ml and dissolved at 160° C. for 2.5 hours for PP or 3 hour.

DSC Analysis

DSC analysis was measured with a Mettler TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) is determined from the cooling step, while main melting temperature (Tm) and heat of melting ($H_m$) are determined from the second heating step.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. with a loading of 2.16 kg (MFR2)

Determination of Xylene Soluble Fraction (XS):

The xylene soluble fraction (XS) as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (wt-percent) can then be determined as follows:

$$XSwt\text{-}\%=(100\times m1\times v0)/(m0\times v1),$$

wherein m0 designates the initial polymer amount (grams), m1 defines the weight of residue (grams), v0 defines the initial volume (milliliter) and v1 defines the volume of the analysed sample (milliliter).

Crystex

Crystalline and Soluble Fractions and their Respective Properties

The crystalline (CF) and soluble fractions (SF) of the polypropylene (PP) compositions as well as the comonomer content and intrinsic viscosities of the respective fractions were analyzed by the CRYSTEX QC Polymer Char (Valencia, Spain).

A schematic representation of the CRYSTEX QC instrument is presented in Del Hierro, P.; Ortin, A.; Monrabal, B.; 'Soluble Fraction Analysis in polypropylene, The Column, February 2014. Pages 18-23. The crystalline and amorphous fractions are separated through temperature cycles of dissolution at 160° C., crystallization at 40° C. and re-dissolution in 1,2,4-trichlorobenzene (1,2,4-TCB) at 160° C. Quantification of SF and CF and determination of ethylene content (C2) are achieved by means of an infrared detector (IR4) and an online 2-capillary viscometer is used for determination of the intrinsic viscosity (IV).

IR4 detector is multiple wavelength detector detecting IR absorbance at two different bands (CH3 and CH2) for the determination of the concentration determination and the Ethylene content in Ethylene-Propylene copolymers. IR4 detector is calibrated with series of EP copolymers with known Ethylene content in the range of 2 wt.-% to 69 wt.-% (determined by 13C-NMR).

Amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt %.

Intrinsic viscosity (IV) of the parent EP copolymer and its soluble and crystalline fractions are determined with a use of an online 2-capillary viscometer and are correlated to corresponding IV's determined in decalin according to ISO 1628.

Calibration is achieved with several commercial EP PP copolymers with IV=2-4 dl/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallization of the sample and separation of the soluble fraction from the crystalline part is taking place. This process is repeated two times. During the first injection the whole sample is measured at high temperature, determining the IV [dl/g] and the C2[wt %] of the PP composition. During the second injection the soluble fraction (at low temperature) and the crystalline fraction (at high temperature) with the crystallization cycle are determined (wt % SF, wt % C2, IV).

The flexural modulus is determined using ISO178 and is measured on samples prepared from injection molded specimens as described in EN ISO 1873-2 (80×10×4 mm)

Charpy Notched Impact Strength

Charpy Notched impact strength was determined (after 96 hours of conditioning at 23° C. and 50% relative humidity) according to ISO 179 1 eA at 23° C. and −20° C. using 80×10×4 mm$^3$ test bars injection moulded in line with EN ISO 1873-2.

Dynamic Mechanical Analysis (DMA)

The glass transition temperature Tg and storage modulus (G') were determined by dynamic mechanical analysis according to ISO 6721-7. The measurements are done in torsion mode on compression moulded samples (40×10×1 mm$^3$) between −100° C. and +150° C., with a heating rate of 2° C./min and a frequency of 1 Hz.

Intrinsic Viscosity (IV)

The intrinsic viscosity (IV) value increases with the molecular weight of a polymer. The IV values were measured according to ISO 1628/1 in decalin at 135° C.

Quantification of Copolymer Microstructure by NMR Spectroscopy

Quantitative 13C{1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)3) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6k) transients were acquired per spectra. Quantitative 13C{1H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer:

$$fE=(E/(P+E)$$

The comonomer fraction was quantified using the method of W-J. Wang and S. Zhu, Macromolecules 2000, 33 1157, through integration of multiple signals across the whole spectral region in the 13C{1H} spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction:

$E[\text{mol \%}]=100*fE$

The weight percent comonomer incorporation was calculated from the mole fraction:

$E[\text{wt \%}]=100*(fE*28.06)/((fE*28.06)+((1-fE)*42.08))$

EXAMPLES

Metallocene Synthesis

Chemicals Used for Complex Preparation:

2,6-Dimethylaniline (Acros), 1-bromo-3,5-dimethylbenzene (Acros), 1-bromo-3,5-di-tert-butylbenzene (Acros), bis(2,6-diisopropylphenyl)imidazolium chloride (Aldrich), triphenylphosphine (Acros), NiCl2(DME) (Aldrich), dichlorodimethylsilane (Merck), ZrCl4 (Merck), trimethylborate (Acros), Pd(OAc)2 (Aldrich), NaBH4 (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), K2CO3 (Merck), 12 M HCl (Reachim), TsOH (Aldrich), MgSO4 (Merck), Na2CO3 (Merck), Na2SO4 (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4A (Merck). Diethyl ether, THF, and 1,2-dimethoxyethane for organometallic synthesis were distilled over sodium benzophenonektyl. CDCl3 (Deutero GmbH) and CD2Cl2 (Deutero GmbH) were dried over molecular sieves 4A. 4,8-dibromo-1-methoxy-2-methyl-1,2,3,5,6,7-hexahydro-s-indacene and 5-tert-butyl-7-(3,5-di-tert-butylphenyl)-6-methoxy-2-methyl-1H-indene were obtained as described in WO2015/158790.

Synthesis of MC1 (Inventive Metallocene)

4,8-Di(3,5-dimethylphenyl)-6-methyl-1,2,3,5-tetrahydro-s-indacene

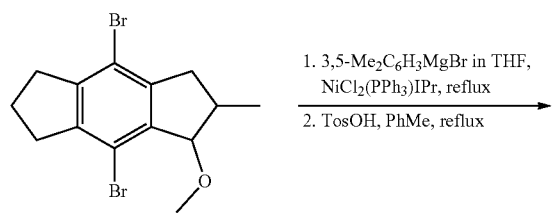

1. 3,5-Me2C6H3MgBr in THF, NiCl2(PPh3)IPr, reflux
2. TosOH, PhMe, reflux

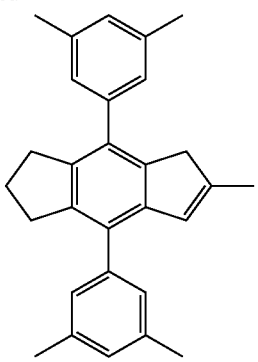

To a mixture of 2.0 g (2.56 mmol) of NiCl2(PPh3)IPr and 36.3 g (100.8 mmol) of 4,8-dibromo-1-methoxy-2-methyl-1,2,3,5,6,7-hexahydro-s-indacene 500 ml (250 mmol, 2.5 equiv) of 0.5 M 3,5-dimethylphenylmagnesium bromide in THF was added at a such rate to maintain a gentle reflux (for ca. 15 min). The resulting solution was refluxed additionally for 1 h, then cooled to room temperature, and 1200 ml of 0.5 M HCl and 500 ml of dichloromethane were added. The organic layer was separated, dried over K2CO3, passed through a short pad of silica gel 60 (40-63 μm, ca. 30 ml) and then evaporated to dryness to give the crude mixture of the diastereoisomers of 4,8-di(3,5-dimethylphenyl)-1-methoxy-2-methyl-1,2,3,5,6,7-hexahydro-s-indacene as a brownish oil. Further on, 315 mg of TsOH was added to a solution of the crude product in 420 ml of toluene, and the resulting mixture was refluxed using Dean-Stark head for 10 min. Then, one more portion of 220 mg of TsOH was added, and the obtained mixture was refluxed for 10 min. Finally, the last operation was repeated with 50 mg of TsOH. After cooling to room temperature the reaction mixture was washed with 200 ml of 10% K2CO3. The organic layer was separated, and the aqueous layer was additionally extracted with 200 ml of dichloromethane. The combined organic extract was dried over anhydrous K2CO3 (the organic layer became crimson at this stage), passed through a short pad of silica gel 60 (40-63 μm, 30 ml), and the resulting light-yellow solution was evaporated to ca. 30 ml to give a solution with a significant amount of a white precipitate. To this mixture 300 ml of n-hexane was added. The precipitated solid was filtered off (G3), washed with n-hexane, and dried in vacuum. This procedure gave 29.33 g (77.48 mmol, 76.9%) of 4,8-di(3,5-dimethylphenyl)-6-methyl-1,2,3,5-tetrahydro-s-indacene as a white fine-crystalline solid. The mother liquor was evaporated to dryness to give a yellowish solid mass. This mass was triturated with 40 ml of warm n-hexane, cooled to room temperature, and filtered off (G3). The obtained solid was washed with n-hexane and dried in vacuum. This procedure gave additionally 4.55 g (12.02 mmol, 11.9%) of 4,8-di(3,5-dimethylphenyl)-6-methyl-1,2,3,5-tetrahydro-s-indacene as a white powder. Thus, the total yield the title product was 33.88 g (89.5 mmol, 88.8%).

$^1$H NMR (CDCl$_3$): δ 7.04 (s, 2H), 7.03 (s, 2H), 6.98 (s, 2H), 6.43 (m, 1H), 3.23 (s, 2H), 2.89 (t, J=7.3 Hz, 2H), 2.83 (t, J=7.3 Hz, 2H), 2.38 (s, 6H), 2.37 (s, 6H), 2.04 (s, 3H), 1.99 (quint, J=7.3 Hz, 2H). $^{13}$C{$^1$H} NMR (CDCl$_3$): δ 145.38, 142.84, 140.85, 140.43, 140.21, 139.80, 138.37, 137.55, 137.39, 133.44, 129.64, 128.39, 128.19, 127.31, 126.61, 126.34, 42.49, 32.76, 32.51, 26.08, 21.43, 16.81.

31

[4,8-Bis(3,5-dimethylphenyl)-2-methyl-1,5,6,7-tetra-hydro-s-indacen-1-yl]chlorodimethylsilane

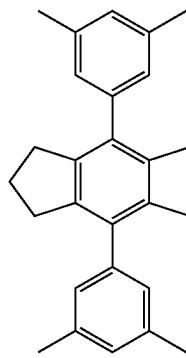

1. "BuLi, Et$_2$O—THF
2. 5 eq. Me$_2$SiCl$_2$

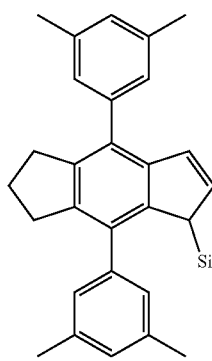

To a suspension of 11.96 g (31.59 mmol) of 4,8-di(3,5-dimethylphenyl)-6-methyl-1,2,3,5-tetrahydro-s-indacene in a mixture of 250 ml of ether and 40 ml of THF, cooled to −30° C., 13.0 ml (31.59 mmol) of 2.43 M "BuLi in hexanes was added in one portion. The resulting mixture was stirred overnight at room temperature, then thus obtained light-orange solution with a large amount of orange precipitate was cooled to −50° C., and 19.0 ml (20.33 g, 157.5 mmol, 4.99 eqv.) of dichlorodimethylsilane was added in one portion. This mixture was stirred overnight at room temperature and then filtered through a glass frit (G3), the flask and filter cake were rinsed with 50 ml of toluene. The filtrate was evaporated to dryness to give 14.9 g (~100%) of the title compound as a white solid mass which was further used without an additional purification.

$^1$H NMR (CDCl$_3$): δ 7.09 (s, 2H), 7.02-6.94 (m, 4H), 6.51 (m, 1H), 4.07 (s, 1H), 3.26-3.14 (m, 1H), 2.95-2.79 (m, 2H), 2.60 (ddd, J=12.4 Hz, J=8.4 Hz, J=4.1 Hz, 1H), 2.38 and 2.37 (2s, sum 12H), 2.24 (s, 3H), 2.12-1.99 (m, 1H), 1.95-1.80 (m, 1H), −0.16 (s, 3H), −0.20 (s, 3H). $^{13}$C{$^1$H} NMR (CDCl$_3$): δ 146.19, 143.17, 140.68, 140.29, 139.94, 139.92, 138.37, 137.59, 137.42, 132.60, 129.86, 128.52, 128.24, 127.85, 127.28, 126.32, 49.67, 33.33, 32.73, 26.15, 21.45, 21.42, 18.10, 3.92, −1.45.

32

[4,8-Bis(3,5-dimethylphenyl)-2-methyl-1,5,6,7-tetra-hydro-s-indacen-1-yl][6-tert-butyl-4-(3,5-dimeth-ylphenyl)-5-methoxy-2-methyl-1H-inden-1-yl]dim-ethylsilane

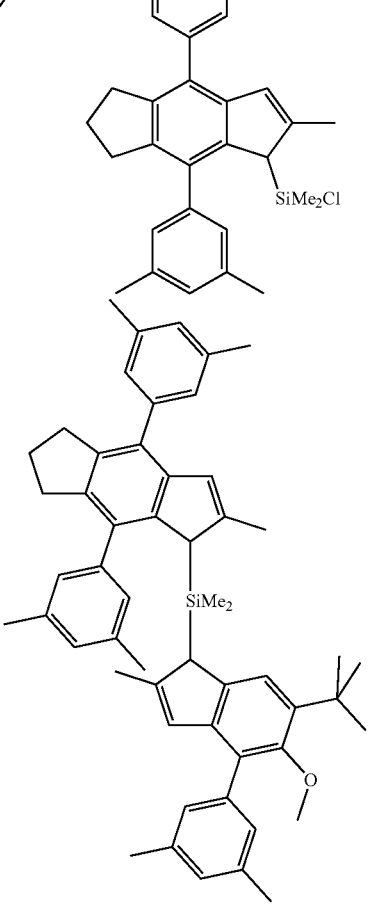

1. "BuLi, Et$_2$O
2. CuCN
3.

To a solution of 10.13 g (31.59 mmol) of 5-tert-butyl-7-(3,5-dimethylphenyl)-6-methoxy-2-methyl-1H-indene (produced as described above for MC-1) in 250 ml of ether, cooled to −30° C., 13.0 ml (31.59 mmol) of 2.43 M "BuLi in hexanes was added in one portion. This mixture was stirred overnight at room temperature, then the resulting light-orange solution with a small amount of precipitate was cooled to −45° C., and 200 mg of CuCN was added. The obtained mixture was stirred for 0.5 h at −25° C., then a solution of 14.9 g (31.59 mmol) of [4,8-bis(3,5-dimeth-ylphenyl)-2-methyl-1,5,6,7-tetrahydro-s-indacen-1-yl]chlo-rodimethylsilane (prepared above) in 200 ml of THF was added in one portion. This mixture was stirred overnight at room temperature, then filtered through a pad of silica gel 60 (40-63 μm), which was additionally washed by 2×50 ml of dichloromethane. The combined organic elute was evaporated to dryness, and the residue was dried in vacuum at elevated temperature to give 24.0 g (ca. 100% of ca. 90% purity) of the title product (ca. 55:45 mixture of the stereoisomers) as a slightly yellowish solid foam which was further used without an additional purification.

$^1$H NMR (CDCl$_3$): δ 7.27 and 7.25 (2s, sum 2H), 7.04 (s, 4H), 6.98, 6.95 and 6.93 (3s, sum 3H), 6.90 and 6.85 (2s, sum 1H), 6.46 (s, 1H), 6.23 and 6.20 (2s, sum 1H), 4.41 and 4.16 (2s, sum 1H), 3.30-2.62 (m, 1H), 3.22 and 3.20 (2s, sum 3H), 3.04-2.79 (m, 2H), 2.68-2.56 (m, 1H), 2.39 (s, 6H), 2.35 (s, 9H), 2.32 (s, 3H), 2.18-1.80 (6s and 2m, sum 9H), 1.44 and 1.38 (2s, sum 9H), −0.52, −0.58, −0.62 and −0.73 (4s, sum 6H).

Anti-dimethylsilanediyl[2-methyl-4,8-di(4-tert-butylphenyl)-1,5,6,7-tetrahydro-s-indacen-1-yl][2-methyl-4-(3,5-dimethylphenyl)-5-methoxy-6-tert-butylinden-1-yl]hafnium dichloride

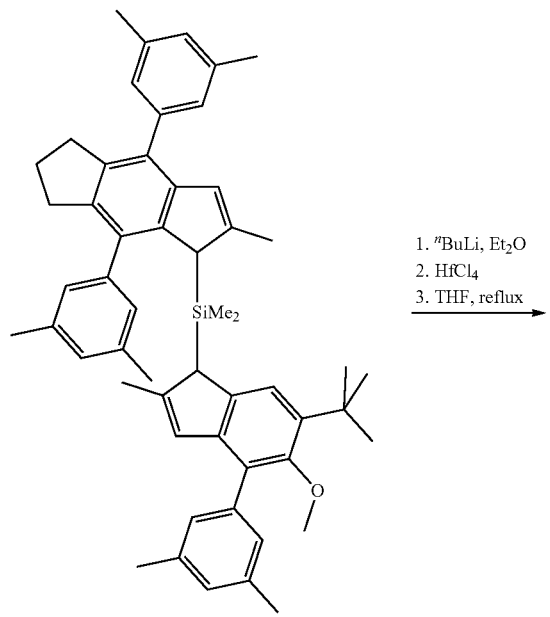

1. $^n$BuLi, Et$_2$O
2. HfCl$_4$
3. THF, reflux $^n$BuLi in hexanes (2.43 M, 32.2 ml, 78.25 mmol) was added in one portion to a yellowish solution of [2-methyl-4,8-bis(3,5-dimethylphenyl)-1,5,6,7-tetrahydro-s-indacen-1-yl][2-methyl-4-(3,5-dimethylphenyl)-5-methoxy-6-tert-butyl-1H-inden-1-yl]dimethylsilane (29.5 g, 39.07 mmol, 95% purity, prepared as describe above) in 250 ml of ether cooled to −50° C. This mixture was stirred for 5.5 h at room temperature, then the resulting dark red solution was cooled to −50° C., and HfCl$_4$ (12.52 g, 39.09 mmol) was added. The reaction mixture was stirred for 24 h at room temperature to give red solution containing LiCl precipitate. This mixture was evaporated to dryness, 150 ml of THF was added to the residue, and the resulting mixture was heated for 24 h at 65° C. The so obtained mixture was evaporated to dryness, the residue was taken up in 100 ml of warm toluene, the so obtained suspension was filtered through glass frit (G4), and the filter cake was washed with 10 ml of toluene. This solution was evaporated to dryness, and the residue was dissolved in 50 ml of hot n-hexane. The yellow fine crystalline solid precipitated from this solution overnight at room temperature was collected and dried in vacuum. This procedure gave 16.6 g of anti-hafnocene dichloride, containing ca. 1.1 mol of n-hexane per mol of the complex (or 1.4 g of n-hexane in the specified quantity), so the adjusted net weight of the isolated anti-complex was 15.2 g (39%). The mother liquor was evaporated to dryness, and the residue was dissolved in 60 ml of n-pentane. Yellow powder precipitated from this solution over several days at −30° C. was filtered off (G4) and then dried in vacuum to give 9.4 g of the target anti-complex, contaminated with ~5% of an unidentified complex, and containing ca. 0.6 equiv of n-hexane per equiv of the target complex. The total isolated pure anti-MC1 corresponds to 62% isolated yield.

Comparative Metallocene (MCC)

Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride (MCC)

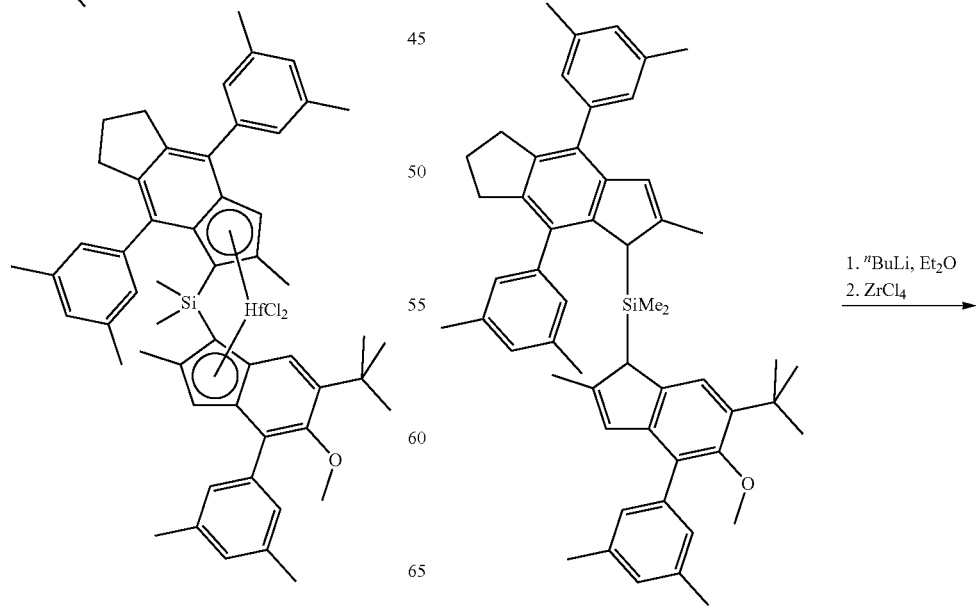

1. $^n$BuLi, Et$_2$O
2. ZrCl$_4$

-continued

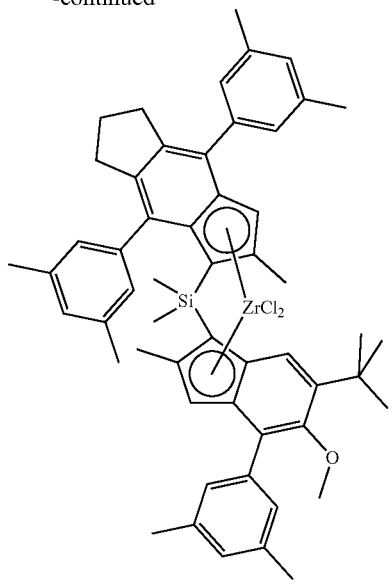

To a slightly cloudy yellowish solution of 23.06 g (30.54 mmol) of [4,8-bis(3,5-dimethylphenyl)-2-methyl-1,5,6,7-tetrahydro-s-indacen-1-yl][6-tert-butyl-4-(3,5-dimethylphenyl)-5-methoxy-2-methyl-1H-inden-1-yl]dimethylsilane in 250 ml of ether, cooled to −30° C., 25.1 ml (60.99 mmol) of 2.43 M ″BuLi in hexanes was added in one portion. This mixture was stirred for 5.5 h at room temperature, then, the resulting red solution was cooled to −50° C., and 7.12 g (30.55 mmol) of $ZrCl_4$ was added. The reaction mixture was stirred for 24 h at room temperature to give dark-red solution with precipitate of LiCl. On the evidence of NMR spectroscopy, this solution included a ca. 85/15 mixture of anti- and syn-zirconocene dichlorides contaminated with some other impurities. This mixture was evaporated to dryness (to the state of red foam), and the residue was treated with 100 ml of warm toluene. The obtained suspension was filtered through glass frit (G4), the filter cake was washed with 2×50 ml of warm toluene. The filtrate was evaporated to dryness, and the residue was dissolved in 70 ml of hot n-hexane. The light-orange precipitate fallen from this solution overnight at room temperature was collected and dried in vacuum. This procedure gave 7.8 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride, containing ca. 1.0 mol of n-hexane per mol of the complex, so the adjusted net weight of the isolated anti-complex was 7.13 g (26%). The mother liquor was evaporated to ca. 60 ml. Light-orange powder precipitated from this solution overnight at −25° C. was collected and dried in vacuum. This procedure gave 8.6 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride, containing ca. 0.75 mol of n-hexane per mol of the complex (or 0.57 g of n-hexane in 8.6 g of the product), so the adjusted net weight of the isolated anti-complex was 8.03 g (29%).

Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride×1.0 ″hexane Anal. calc. for $C_{54}H_{60}Cl_2OSiZr×C_6H_{14}$: C, 71.96; H, 7.45. Found: C, 72.30; H, 7.69.

$^1$H NMR (CDCl$_3$): δ 7.55-6.90 (very br.s., 4H), 7.39 (s, 1H), 7.10 (s, 1H), 7.03 (s, 1H), 6.98 (s, 1H), 6.95 (s, 1H), 6.94 (s, 1H), 6.81 (s, 1H), 6.58 (s, 1H), 3.41 (s, 3H), 3.15-3.01 (m, 2H), 2.93 (ddd, J=16.0 Hz, 8.1 Hz, 3.3 Hz, 1H), 2.51-2.41 (m, 1H), 2.39 (s, 3H), 2.36 (s, 3H), 2.34 (s, 12H), 2.30 (s, 3H), 2.04 (s, 3H), 2.07-1.95 (m, 1H), 1.85-1.68 (m, 1H), 1.35 (s, 9H), 1.14 (s, 3H), −0.13 (s, 3H). $^{13}$C{$^1$H} NMR (CDCl$_3$): δ 159.87, 144.73, 144.10, 143.25, 141.39, 138.39, 138.08, 137.81, 137.47, 136.90, 134.61, 134.39, 134.26, 132.05, 131.96, 131.74, 131.11, 128.96, 128.91, 128.82, 128.74, 127.74, 127.44, 127.01 (br.s), 126.76, 123.42, 123.12, 121.60, 121.08, 82.55, 81.91, 62.67, 35.68, 33.87, 32.39, 30.39, 26.04, 21.53, 21.47, 21.41, 21.24, 19.78, 18.60, 3.62, 1.70.

Preparation of MAO-Silica Support.

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32.2 kg) was added. The mixture was stirred (40 rpm) for 15 min. Next 30 wt % solution of MAO in toluene (17.5 kg) from Lanxess was added via 12 mm line on the top of the reactor within 70 min. The reaction mixture was heated up to 90° C. and stirred at 90° C. for additional two hours. The slurry was allowed to settle and the mother liquor was filtered off. The solid was washed twice with toluene (32.2 kg) at 90° C., following by settling and filtration. The reactor was cooled off to 60° C. and the solid was washed with heptane (32.2 kg).

Finally the solid was dried at 60° C. for 2 h under nitrogen flow 2 kg/h, pressure 0.3 bar-g and then for 5 hours under vacuum (−0.5 bar-g) with stirring at 5 rpm. This solid MAO-silica carrier was collected as a free-flowing white powder containing 12.7% Al by weight.

Catalyst Preparation

Catalyst CE1a (comparative). In a nitrogen filled glovebox, a solution of MAO 0.2 mL (30% wt in toluene, AXION 1330 CA Lanxess) in dry toluene (2.3 mL) was added to an aliquot of metallocene MCC (24.9 mg, 27 µmol). The mixture was stirred for 60 minutes at room temperature. Next, 2.0 g of MAO treated silica prepared as described above, was placed in a glass reactor equipped with a porous glass frit. The solution of metallocene and MAO in toluene was then slowly added to the support over the course of 5 minutes with gentle mixing. The resulting mixture was shaken well and allowed to stay overnight. Then dry toluene (10 mL) was added, and the slurry was mixed well with the inert gas sparging through the filter net over 10 minutes. The solid was allowed to settle, and liquid was filtered off and discarded. The resulting cake was dried in vacuum for 1 hour to yield 1.9 g of the catalyst as pink free flowing powder.

Catalyst CE1b (Comparative)

30 wt % MAO in toluene (0.7 kg) was added into a steel nitrogen blanked reactor via a burette at 20° C. Toluene (5.4 kg) was then added under stirring. Metallocene MCC (93 g) was added from a metal cylinder followed by flushing with 1 kg toluene. The mixture was stirred for 60 minutes at 20° C. Trityl tetrakis(pentafluorophenyl)borate (91 g) was then added from a metal cylinder followed by a flush with 1 kg of toluene. The mixture was stirred for 1 h at room temperature. The resulting solution was added to a stirred cake of MAO-silica carrier, prepared as described above, over 1 hour. The cake was allowed to stay for 12 hours, followed by drying under N2 flow at 60 C for 2 h and additionally for 5 h under vacuum (−0.5 barg) under stirring.

Dried catalyst was sampled in the form of pink, free flowing powder containing 13.9% Al and 0.11% Zr
Catalyst IE1a (Inventive).

In a nitrogen filled glovebox, a solution of MAO 0.2 mL (30% wt in toluene, AXION 1330 CA Lanxess) in dry toluene (2.3 mL) was added to an aliquot of metallocene MC1 (29.7 mg, 27 µmol). The mixture was stirred for 30 minutes at room temperature. Then trityl tetrakis(pentafluorophenyl)borate (25.6 mg, 28 µmol) was added to the mixture, and the mixture was stirred for another 30 minutes. Next, 2.0 g of MAO-silica carrier prepared as described above, was placed in a glass reactor equipped with a porous glass frit. A solution of metallocene and MAO in toluene was then slowly added to the support over the course of 5 minutes with gentle mixing. The resulting mixture was shaken well and allowed to stay overnight. Then dry toluene (10 mL) was added, and the slurry was mixed well with the inert gas sparging through the filter net over 10 minutes. The solid was allowed to settle, and liquid was filtered off and discarded. The resulting cake was dried in vacuum for 1 hour to yield 1.9 g of the catalyst as yellow free flowing powder.

TABLE 1a

Catalyst summary:

| Example | MC | B:TM Molar (*) | Al found, wt. % | Zr found, wt. % | Hf found, wt. % | MC wt. % (**) |
|---|---|---|---|---|---|---|
| CE1a | MCC | 0 | 12.9 | 0.083 | — | 0.86 |
| CE1b | MCC | 1 | 13.9 | 0.11 | — | 1.07 |
| IE1a | MC1 | 1 | 13.0 | — | 0.17 | 0.95 |

(*) Boron to transition metal molar ratio;
(**) calculated metallocene content in catalyst TABLE 1b Catalyst summary:

| Code | Boron added | MC, umol/g silica | Al found, wt. % | Zr found, wt. % | Hf found, wt. % |
|---|---|---|---|---|---|
| Cat CE1a | N | 17 | 12.9 | 0.083 | — |
| Cat CE1b | Y | 34 | 12.9 | 0.197 | — |
| Cat MC1a | Y | 17 | 13.0 | — | 0.17 |

We have also compared the properties of the copolymers of the invention with heterophasic polypropylene copolymers prepared using Ziegler-Natta catalysis.
Polymerisations:

The details of the polymerisation procedures are described in the following:
Step 1: Prepolymerisation and Bulk Homopolymerisation A 20.9 L stainless-steel reactor containing 0.4 barg propylene was filled with 3950 g propylene. Triethylaluminum (0.80 ml of a 0.62 mol/l solution in heptane) was injected into the reactor by additional 240 g propylene. The solution was stirred at 20° C. and 250 rpm for at least 20 min. The catalyst was injected as described in the following. The desired amount of solid, catalyst was loaded into a 5 ml stainless steel vial and a second 5 ml vial containing 4 ml n-heptane was added on top inside a glovebox. Then the vial on top was pressurized with 5 bars of nitrogen. This catalyst feeder system is mounted on a port on the lid of the reactor. Immediately afterwards 2.0 or 0.1 NL of H2 (see polymerisation tables) was dosed via mass flow controller in one minute. The valve between the two vials was opened and the solid catalyst was contacted with heptane under nitrogen pressure for 2 s, then flushed into the reactor with 340 g propylene. The prepolymerisation was run for 10 min at 20° C. At the end of the prepolymerisation step the temperature was raised to 75° C. When only 0.1 NL of H2 was fed before the catalyst, then, when the internal reactor temperature has reached 60° C., 1.9 NL of H2 was added via mass flow controller. The reactor temperature was held constant at 75° C. throughout the polymerisation. The polymerisation time was measured starting when the internal reactor temperature reached 2° C. below the set polymerisation temperature.

Step 2: Gas Phase Ethylene-Propylene Copolymerisation

After the bulk homopolymerisation step was completed, the stirrer speed was reduced to 50 rpm and the pressure was reduced down to 0.4 bar-g by venting the monomers. Then triethylaluminum (0.80 ml of a 0.62 mol/l solution in heptane) was injected into the reactor by additional 250 g propylene through a steel vial. The pressure was then again reduced down to 0.4 bar-g by venting the monomers. The stirrer speed was set to 180 rpm and the reactor temperature was set to 70° C.

Then the reactor pressure was increased to 20 bar-g by feeding a desired C3/C2 gas mixture (see polymerisation tables) of composition defined by:

$$\left(\frac{C_2}{C_3}\right)_{gas\ feed\ in\ transition} = \frac{\left(\frac{C_2}{C_3}\right)_{target\ polymer\ composition}}{R}$$

where C2/C3 is the weight ratio of the two monomers and R is their reactivity ratio. In the present experiments, we used R=0.44 and 0.49 for the zirconium catalysts CE1a and CE1b respectively, and 0.38 for the hafnium catalyst IE1a.

The temperature is held constant by thermostat and the pressure is kept constant by feeding via mass flow controller a C3/C2 gas mixture of composition corresponding to the target polymer composition, until the set duration for this step has lapsed.

Then the reactor is cooled down to about 30° C. and the volatile components flashed out. After purging the reactor 3 times with N2 and one vacuum/N2 cycle, the product is taken out and dried overnight in a fume hood. 100 g of the polymer is additivated with 0.5 wt % Irganox B225 (solution in acetone) and dried overnight in a hood followed by one hour in a vacuum drying oven at 60° C.

TABLE 2

Polymerisation examples: set-up, prepoly and transition to bulk step

| patent example # | catalyst | Matrix produced in liquid monomer step 1 | Target wt % C2 in gas phase EPR | catalyst amount Mg | MC content of catalyst wt % | H2 fed before catalyst injection NL | C3 total G | Time transition from prepoly to bulk Min | H2 fed at the end of the transition NL |
|---|---|---|---|---|---|---|---|---|---|
| CPE1 | CE1a | hPP | C2 = 25 | 59 | 0.86 | 2.02 | 4463 | 17 | 0.000 |
| CPE2 | CE1a | hPP | C2 = 40 | 56 | 0.86 | 2.02 | 4454 | 17 | 0.000 |
| CPE3 | CE1a | hPP | C2 = 25 | 64 | 0.86 | 0.10 | 4450 | 20 | 1.915 |
| CPE4 | CE1a | hPP | C2 = 40 | 66 | 0.86 | 0.10 | 4450 | 20 | 1.915 |
| CPE5 | CE1b | hPP | C2 = 25 | 52 | 1.07 | 2.00 | 4458 | 16 | 0.000 |
| CPE6 | CE1b | hPP | C2 = 40 | 47 | 1.07 | 2.01 | 4461 | 17 | 0.000 |
| CPE7 | CE1b | hPP | C2 = 60 | 49 | 1.07 | 2.01 | 4461 | 16 | 0.000 |
| CPE8 | CE1b | hPP | C2 = 25 | 60 | 1.07 | 0.10 | 4377 | 16 | 1.900 |
| CPE9 | CE1b | hPP | C2 = 40 | 59 | 1.07 | 0.10 | 4478 | 16 | 1.900 |
| CPE10 | CE1b | hPP | C2 = 60 | 59 | 1.07 | 0.10 | 4461 | 17 | 1.900 |
| IPE1 | IE1a | hPP | C2 = 40 | 136.0 | 0.95 | 2.02 | 4453 | 17 | 0.000 |
| IPE2 | IE1a | hPP | C2 = 60 | 141.0 | 0.95 | 2.02 | 4447 | 17 | 0.000 |
| IPE3 | IE1a | hPP | C2 = 25 | 202.0 | 0.95 | 0.10 | 4446 | 18 | 1.916 |
| IPE4 | IE1a | hPP | C2 = 40 | 207.0 | 0.95 | 0.10 | 4451 | 18 | 1.916 |
| IPE5 | IE1a | hPP | C2 = 25 | 61.0 | 0.95 | 2.02 | 4459 | 19 | 0.000 |

TABLE 3

Polymerisation examples: bulk, transition to gas phase, and gas phase steps

| patent example # | catalyst | total H2 NL | Time Min | Pressure flashed down to Barg | Time transition from bulk to GP Min | C2 fed in transition (MFC) G | C3 fed in transition (MFC) G | feed C2/C3 during transition (actual) wt/wt | Ptotal av. barg | Time min | C2 fed in GP (MFC) g | C3 fed in GP (MFC) G |
|---|---|---|---|---|---|---|---|---|---|---|---|---|
| CPE1 | CE1a | 2.02 | 40 | 0.4 | 16 | 242 | 321 | 0.75 | 20 | 90 | 70 | 214 |
| CPE2 | CE1a | 2.02 | 40 | 0.4 | 14 | 304 | 206 | 1.48 | 20 | 90 | 58 | 101 |
| CPE3 | CE1a | 2.02 | 30 | 0.4 | 16 | 250 | 331 | 0.75 | 20 | 120 | 204 | 613 |
| CPE4 | CE1a | 2.02 | 30 | 0.4 | 17 | 320 | 214 | 1.50 | 20 | 120 | 204 | 308 |
| CPE5 | CE1b | 2.00 | 40 | 0.4 | 23 | 238 | 346 | 0.69 | 20 | 90 | 43 | 128 |
| CPE6 | CE1b | 2.01 | 40 | 0.4 | 17 | 289 | 214 | 1.35 | 20 | 90 | 65 | 112 |
| CPE7 | CE1b | 2.01 | 40 | 0.4 | 18 | 337 | 111 | 3.04 | 20 | 90 | 79 | 54 |
| CPE8 | CE1b | 2.00 | 30 | 0.4 | 21 | 238 | 343 | 0.69 | 20 | 120 | 189 | 576 |
| CPE9 | CE1b | 2.00 | 30 | 0.4 | 16 | 296 | 217 | 1.36 | 20 | 120 | 149 | 222 |
| CPE10 | CE1b | 2.00 | 30 | 0.4 | 17 | 350 | 118 | 2.97 | 20 | 120 | 146 | 99 |
| IPE1 | IE1a | 2.02 | 40 | 0.4 | 13 | 311 | 180 | 1.72 | 20 | 90 | 33 | 48 |
| IPE2 | IE1a | 2.02 | 40 | 0.4 | 15 | 357 | 92 | 3.89 | 20 | 90 | 49 | 28 |
| IPE3 | IE1a | 2.02 | 30 | 0.4 | 13 | 254 | 292 | 0.87 | 20 | 120 | 84 | 257 |
| IPE4 | IE1a | 2.02 | 30 | 0.4 | 15 | 319 | 184 | 1.73 | 20 | 120 | 111 | 179 |
| IPE5 | IE1a | 2.02 | 40 | 0.4 | 15 | 237 | 349 | 0.68 | 20 | 90 | 15.7 | 47 |

TABLE 4

Polymerisation examples: Results

| patent example # | Catalyst | Total yield G | Overall productivity kg/g cat | MC productivity kg/gMC | yield GP calculated from SF g | productivity in GP calculated from SF kgPP/$g_{cat}$ | split matrix hPP (based on soluble fraction) % | split EPR, gas phase (based on SF) % | MFR$_2$ powder g/10 min | XS wt % | Soluble Fraction Crystex wt % | Crystalline fraction wt % |
|---|---|---|---|---|---|---|---|---|---|---|---|---|
| CPE1 | CE1a | 1418 | 24.0 | 2795 | 303 | 5.1 | 79 | 21 | 1.0 | 20.4 | 21.4 | 78.6 |
| CPE2 | CE1a | 1219 | 21.8 | 2531 | 193 | 3.4 | 84 | 16 | 1.4 | 15.0 | 15.8 | 84.2 |
| CPE3 | CE1a | 1086 | 17.0 | 1973 | 819 | 12.8 | 25 | 75 | 0.2 | 66.6 | 75.4 | 24.6 |
| CPE4 | CE1a | 802 | 12.2 | 1413 | 525 | 8.0 | 34 | 66 | 0.3 | 58.0 | 65.5 | 34.5 |
| CPE5 | CE1b | 1097 | 21.1 | 1972 | 178 | 3.4 | 84 | 16 | 2.2 | 15.9 | 16.2 | 83.8 |
| CPE6 | CE1b | 1403 | 29.9 | 2790 | 174 | 3.7 | 88 | 12 | 2.3 | 11.7 | 12.4 | 87.8 |
| CPE7 | CE1b | 1260 | 25.7 | 2403 | 120 | 2.4 | 90 | 10 | 2.9 | 9.0 | 9.5 | 90.5 |
| CPE8 | CE1b | 1300 | 21.7 | 2025 | 784 | 13.1 | 40 | 60 | 0.8 | | 60.3 | 39.7 |
| CPE9 | CE1b | 930 | 15.8 | 1473 | 356 | 6.0 | 62 | 38 | 3.0 | | 38.3 | 61.7 |
| CPE10 | CE1b | 800 | 13.6 | 1267 | 222 | 3.8 | 72 | 28 | 3.5 | | 27.8 | 72.2 |

TABLE 4-continued

Polymerisation examples: Results

| patent example # | Catalyst | Total yield G | Overall productivity kg/g cat | MC productivity kg/gMC | yield GP calculated from SF g | productivity in GP calculated from SF kgPP/$g_{cat}$ | split matrix hPP (based on soluble fraction) % | split EPR, gas phase (based on SF) % | $MFR_2$ powder g/10 min | XS wt % | Soluble Fraction Crystex wt % | Crystalline fraction wt % |
|---|---|---|---|---|---|---|---|---|---|---|---|---|
| IPE1 | IE1a | 1109 | 8.2 | 858 | 94 | 0.7 | 92 | 8 | 0.7 | 7.7 | 8.5 | 91.5 |
| IPE2 | IE1a | 1090 | 7.7 | 814 | 73 | 0.5 | 93 | 7 | 0.8 | 6.4 | 6.7 | 93.3 |
| IPE3 | IE1a | 1323 | 6.5 | 689 | 320 | 1.6 | 76 | 24 | 0.5 | 21.9 | 24.2 | 75.8 |
| IPE4 | IE1a | 1140 | 5.5 | 580 | 280 | 1.4 | 75 | 25 | 1.2 | 21.6 | 24.6 | 75.4 |
| IPE5 | IE1a | 554 | 9.1 | 956 | | | 91 | 9 | 0.9 | 10.5 | 9.2 | 90.8 |

TABLE 5

Polymer properties

| patent example # | Catalyst | IV (SF) (Crystex) dl/g | C2 (SF) (Crystex) wt % | $M_n$ g/mol | $M_w$ g/mol | $M_w/M_n$ | $T_c$ ° C. | $T_m$ ° C. |
|---|---|---|---|---|---|---|---|---|
| CPE1 | CE1a | 4.5 | 21.7 | 174000 | 509500 | 2.9 | 112 | 153 |
| CPE2 | CE1a | 4.4 | 33.6 | 159500 | 434000 | 2.7 | 112 | 152 |
| CPE3 | CE1a | 5.3 | 24.9 | n.m. | n.m. | n.m. | 112 | 153 |
| CPE4 | CE1a | 5.1 | 39.3 | 186000 | 559500 | 3.0 | 112 | 151 |
| CPE5 | CE1b | 3.8 | 22.2 | 153500 | 459000 | 3.0 | 112 | 155 |
| CPE6 | CE1b | 3.5 | 33.6 | n.m. | n.m. | n.m. | 113 | 156 |
| CPE7 | CE1b | 4.0 | 47.3 | n.m. | n.m. | n.m. | | |
| CPE8 | CE1b | 4.2 | 23.2 | 147000 | 472000 | 3.2 | 114.4 | 155 |
| CPE9 | CE1b | 3.4 | 36.9 | 145000 | 414500 | 2.9 | 114.5 | 155 |
| CPE10 | CE1b | 4.4 | 54.0 | 160500 | 454500 | 2.8 | 114.6 | 155 |
| IPE1 | IE1a | 6.4 | 28.4 | n.m. | n.m. | n.m. | 114.9 | 160 |
| IPE2 | IE1a | 6.0 | 44.8 | n.m. | n.m. | n.m. | 116.0 | 159 |
| IPE3 | IE1a | 7.6 | 21.7 | 428000 | 1070000 | 2.5 | 114.1 | 158 |
| IPE4 | IE1a | 6.1 | 36.2 | 289000 | 678000 | 2.3 | | |
| IPE5 | IE1a | 6.8 | 17.5 | 347500 | 848000 | 2.4 | 116 | 159 |

CPE11 (a Ziegler Natta heterophasic polypropylene copolymer) and CPE12 (a heterophasic polypropylene copolymer prepared according to WO2013/007650) are also used for comparison. Both of these examples are prepared in a Borstar pilot plant, with a reactor chain of prepolymerisation: loop; first gas phase reactor and second gas phase reactor. For CPE11, TEAL and donor are used. Details of the production process are given in Table 6.

TABLE 6

| | | CPE11 | CPE12 |
|---|---|---|---|
| Loop | | | |
| Feed H2/C3 | mol/kmol | 0.1 | 0.1 |
| MFR | g/10 min | 0.32 | 0.8 |
| C2 | wt % | 0 | 0 |
| Split | wt % | 34 | 40 |
| XCS | wt % | 4.4 | 0.9 |
| First gas phase reactor | | | |
| Temperature | ° C. | 70 | 75 |
| H2/C3 | mol/kmol | 1.1 | 1.9 |
| MFR | g/10 min | 0.3 | 0.8 |
| C2 | wt % | 0 | 0 |
| Split | wt % | 53 | 45 |
| XCS | wt % | 2.2 | 0.7 |
| Second gas phase reactor | | | |
| Temperature | ° C. | 70 | 75 |
| Split | wt % | 13 | 15 |
| H2/C2 | mol/kmol | 209 | 0 |
| C2/C3 | mol/kmol | 503 | 638 |
| MFR | g/10 min | 0.4 | 1.1 |
| C2 | wt % | 6.3 | 2.5 |
| XCS | wt % | 14.3 | 16.2 |

TABLE 7

Further properties of examples 1 and 2.
IE1 and IE2 (or its blend), CPE11 or CPE12 were compounded with 0.15 parts of Irganox
B225 and 0.05 parts of calcium stearate. Properties of the blend are provided below.

|  |  | IPE1 | IPE2 | IPE1(50 wt %) + IPE2 (49.8 wt %) | CPE11 | CPE12 |
|---|---|---|---|---|---|---|
| Flex Modulus | MPa | 1387 | 1439 | 1415 | 1071 | 735 |
| SF | Wt % | 8 | 7 |  | 14 | 16 |
| G' | MPa | 712 | 706 | 740 | 573 | 466 |
| Tg1 | ° C. | 1.2 | 1.2 | 1.2 | 1.2 | −0.9 |
| Tg2 | ° C. | −50.5 | −55.7 | −59.7 | −51.4 | −32.9 |
| Notched Impact Strength/23° C. | kJ/m2 | 52.05 | 17.0 | 44.22 | 39.76 | 30 |
| Notched Impact Strength/−20° C. | kJ/m2 | 5.42 | 4.7 | 4.66 | 2.15 | 1.25 |
| C2 | wt % | 3.46 | 3.06 |  | 6.22 | 4.23 |
| MFR | g/10 min | 0.7 | 0.8 |  | 0.4 | 0.9 |
| Tm | ° C. | 160.2 | 159.4 |  | 163 | 154 |
| C2(SF) | Wt % | 28.35 | 44.77 |  | 33.86 | 17.04 |
| IV(SF) | dl/g | 6.38 | 6.01 |  | 2.16 | 1.47 |

CE13 to 14 are prepared using (rac-anti-dimethylsilanediyl [2-methyl-4-(3',5'-dimethyl phenyl)-1,5,6,7-tetrahydro-s-indacen-1-yl][2-methyl-4-(3',5'-dimethylphenyl)-5-methoxy-6-tert-butyl inden-1-yl] zirconium dichloride dichloride) was synthesized according to the procedure as described in WO2019/007655, pp 49ff.

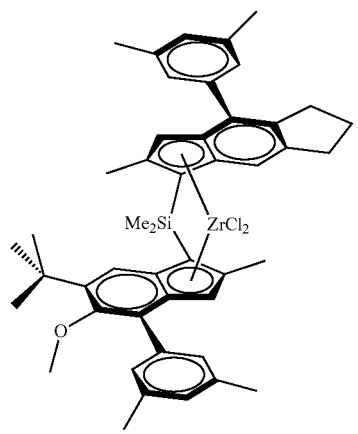

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt % solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.2% Al by weight.

Catalyst Preparation 30 wt % MAO in toluene (0.7 kg) was added into a steel nitrogen blanked reactor via a burette at 20° C. Toluene (5.4 kg) was then added under stirring. The MC3 as cited above (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9% Al and 0.11% Zr.

The polymerisation was done in a 25 L bench scale reactor. The details of the polymerisation are shown in Table 8.

TABLE 8

Polymerisation Data

|  |  | CE13/14 |
|---|---|---|
| Prepolymerisation |  |  |
| Residence time | min | 10 |
| H2 | nl | 0 |
| Bulk step |  |  |
| Temperature | ° C. | 75 |
| Total H2 | nl | 2 |
| Residence time | min | 30 |
| Split | wt % | 78 |
| First Gas phase polymerisation |  |  |
| Temperature | ° C. | 70 |
| Total H2 | nl | 0 |
| Residence time | min | 90 |
| C2/C3 | wt %/wt % | 0.69 |
| Pressure | barg | 16 |
| Split | wt % | 22 |

The polymer powder were stabilized with 1500 ppm of Irganox B225 (supplied by BASF) and 500 ppm of synthetic hydrotalcite (MAHC). CE13 is this base polymer. CE14 is the base polymer nucleated with 2000 ppm of NA 21, commercially available from Adeka.

IE3 and IE4 were compounded with 0.15 parts of Irganox B225 and 0.05 parts of calcium stearate. Properties of the blend are provided below.

TABLE 9

Further properties of IE3 and IE4

| | | IE3 | IE4 | CPE13 | CPE14 |
|---|---|---|---|---|---|
| MFR | g/10 min | 0.5 | 1.2 | 1 | 1 |
| Flex Modulus | MPa | 861 | 947 | 786 | 998 |
| Notched Impact Strength/23° C. | kJ/m2 | 85.87 | 75.57 | 77 | 75 |
| Notched Impact Strength/−20° C. | kJ/m2 | 9.76 | 9.98 | 2.9 | 3.2 |
| SF | wt % | 24 | 25 | 23 | |
| C2 | wt % | 5.95 | 9.17 | 6.8 | |
| C2(SF) | wt % | 21.72 | 36.22 | 23.9 | |
| C2(CF) | wt % | 1.37 | 0.97 | 1.8 | |
| IV(SF) | dl/g | 7.61 | 6.13 | 2.5 | |
| IV(CF) | dl/g | 3.01 | 2.49 | 2.9 | |
| Tm | ° C. | 160 | 160 | 157 | 159 |

The Examples of the invention show that heterophasic polypropylene copolymers with low SF content and low ethylene content in SF in combination with high melting points are possible. The heterophasic polypropylene copolymers also have high IV(SF). This combination of properties gives rise to polymers with a good stiffness, impact balance and the potential to reduce polymer usage in an article.

We also demonstrate that the copolymers of the invention have improved stiffness (low MFR, high flex modulus) and good notch impact strength, especially at low temperature, relative to heterophasic polypropylene Ziegler Natta copolymer CPE11 and metallocene heterophasic polypropylene copolymer CPE12.

In table 9 we demonstrate that the combination of high Tm matrix (shown via the high overall Tm) with very high Mw rubber (shown via high IV of the SF) gives the excellent stiffness/impact balance, especially at low temperature.

The invention claimed is:

1. A heterophasic polypropylene copolymer having an MFR$_2$ of 0.05 to 20 g/10 min (ISO 1133 at 230° C. with a loading of 2.16 kg) and a melting point (Tm) of 156 to 164° C. (measured by DSC according to ISO 11357) wherein the heterophasic polypropylene copolymer comprises at least the following components:
   (A) 55.0 to 95.0 wt % of a crystalline fraction (CF) having a comonomer content of 0 to 3.0 wt %; and
   (B) 5.0 to 45.0 wt % of a soluble fraction (SF) having a comonomer content of 12 to 45 wt %;
   wherein the intrinsic viscosity (IV) (in decalin at 135° C.) of the soluble fraction (SF) is 2.5 to 11 dl/g, and
   wherein the amount of crystalline fraction (CF) and the amount of soluble fraction (SF) are determined in 1,2,4-trichlorobenzene at 40° C.

2. The heterophasic polypropylene copolymer as claimed in claim 1, wherein the heterophasic polypropylene copolymer has an MFR$_2$ of 0.1 to 20 g/10 min (ISO 1133 at 230° C. with a loading of 2.16 kg) and a melting point (Tm) of 157 to 164° C. (measured by DSC according to ISO 11357), and wherein the heterophasic polypropylene copolymer comprises:
   (A) 55.0 to 80.0 wt % of the crystalline fraction (CF); and
   (B) 20.0 to 45.0 wt % of the soluble fraction (SF) having a comonomer content of 12 to 40 wt %;
   wherein the intrinsic viscosity (IV) (in decalin at 135° C.) of the crystalline fraction (CF) is 1.5 to 5.0 dl/g; and
   wherein the intrinsic viscosity (IV) (in decalin at 135° C.) of the soluble fraction (SF) is 4.5 to 11 dl/g.

3. The heterophasic polypropylene copolymer as claimed in claim 1, wherein the heterophasic polypropylene copolymer has an MFR$_2$ of 0.05 to 2.5 g/10 min (ISO 1133 at 230° C. with a loading of 2.16 kg) and a melting point (Tm) of 156 to 163° C. (measured by DSC according to ISO 11357), and wherein the heterophasic polypropylene copolymer comprises:
   (A) 75.0 to 95.0 wt % of the crystalline fraction (CF) having a comonomer content of 0 to 2.0 wt %; and
   (B) 5.0 to 25.0 wt % of the soluble fraction (SF); and
   wherein the intrinsic viscosity (IV) (in decalin at 135° C.) of the soluble fraction (SF) is 2.5 to 10 dl/g.

4. The heterophasic polypropylene copolymer as claimed in claim 1, wherein:
   the heterophasic polypropylene copolymer has a melting point (Tm) of 156 to 162° C. (measured by DSC according to ISO 11357); and/or
   wherein the intrinsic viscosity (IV) of the soluble fraction (SF) (in decalin at 135° C.) is 4.5 to 11 dl/g.

5. The heterophasic polypropylene copolymer as claimed in claim 1, wherein the soluble fraction (SF) has a comonomer content of 12 to 40 wt %.

6. The heterophasic polypropylene copolymer as claimed in claim 1, wherein the flex modulus is at least 800 MPa (ISO178).

7. The heterophasic polypropylene copolymer as claimed in claim 1, wherein the MFR$_2$ (ISO 1133 at 230° C. with a loading of 2.16 kg) of the heterophasic polypropylene copolymer is 0.2 to 1.5 g/10 min.

8. The heterophasic polypropylene copolymer as claimed in claim 1, wherein the heterophasic polypropylene copolymer has having a notched charpy impact strength (−20° C.) of at least 4.0 KJ/m$^2$ (ISO 179 1eA).

9. The heterophasic polypropylene copolymer as claimed in claim 1, wherein the heterophasic polypropylene copolymer has an IV in decalin at 135° C. of 2.0 to 5.0 dl/g.

10. The heterophasic polypropylene copolymer as claimed in claim 1, wherein component (A) has an MFR$_2$ (ISO 1133 at 230° C. with a loading of 2.16 kg) of 0.1 to 4.0 g/10 min.

11. The heterophasic polypropylene copolymer as claimed in claim 1, wherein the heterophasic polypropylene copolymer comprises 80.0 to 95.0 wt % of component (A) and 5.0 to 20.0 wt % of component (B).

12. The heterophasic polypropylene copolymer as claimed in claim 1, wherein the heterophasic polypropylene copolymer comprises 65.0 to 85.0 wt % of component (A) and 35.0 to 15.0 wt % of component (B).

13. The heterophasic polypropylene copolymer as claimed in claim 1, wherein the heterophasic polypropylene copolymer has a 2, 1-regio error content determined by NMR-spectroscopy of 0.01 to 0.6 mol %.

14. The heterophasic polypropylene copolymer as claimed in claim 3, wherein the heterophasic polypropylene copolymer has an MFR$_2$ (ISO 1133 at 230° C. with a loading of 2.16 kg) of 0.2 to 1.5 g/10 min and a melting point (Tm) of 156 to 162° C., and wherein the heterophasic polypropylene copolymer comprises:

(A) 80.0 to 95.0 wt % of a polypropylene homopolymer or propylene ethylene copolymer crystalline fraction having a C2 content of 0 to 2 wt %; and (B) 5.0 to 20.0 wt % of an ethylene-propylene copolymer soluble fraction;

wherein the C2 (SF) is in the range of 18 to 40 wt % and the IV (SF) measured in decalin at 135° C. of said heterophasic polypropylene copolymer is 2.5 to 10 dl/g.

15. The heterophasic polypropylene copolymer as claimed in claim 2, wherein the heterophasic polypropylene copolymer has an $MFR_2$ (ISO 1133 at 230° C. with a loading of 2.16 kg) of 0.2 to 15 g/10 min and a melting point (Tm) of 157 to 162° C., and wherein the heterophasic polypropylene copolymer comprises:

(A) 65.0 to 85.0 wt % of a polypropylene homopolymer or propylene ethylene copolymer crystalline fraction having a C2 content of 0 to 2 wt %;

(B) 35.0 to 15.0 wt % of an ethylene-propylene copolymer soluble fraction;

wherein the C2 (SF) is in the range of 18 to 40 wt % and the IV (SF) measured in decalin at 135° C. of said heterophasic polypropylene copolymer is 4.5 to 11 dl/g.

16. The heterophasic polypropylene copolymer as claimed in claim 1, wherein the crystalline fraction comprises less than 1.5 wt % C2.

17. The heterophasic polypropylene copolymer as claimed in claim 1, wherein the heterophasic polypropylene copolymer is obtained using a single site catalyst.

18. A process for the preparation of a heterophasic polypropylene copolymer comprising:

(I) polymerising propylene and optionally ethylene and/or 1-butene in the presence of the catalyst so as to form:

a1) a crystalline fraction (CF) comprising a propylene homopolymer or propylene copolymer with ethylene and/or with 1-butene having 0 to 3 wt % comonomer as said matrix component; and (II) subsequently polymerising additional propylene and ethylene and optionally 1-butene, in the presence of the matrix component of step (I) so as to form:

a2) a propylene ethylene copolymer or propylene-ethylene-1-butene copolymer soluble fraction (SF) having a comonomer content of 12 to 45 wt %;

wherein the crystalline fraction (CF) constitutes 55.0 to 95.0 wt % and the soluble fraction (SF) constitutes 5.0 to 45.0 wt % of the heterophasic propylene ethylene copolymer or heterophasic propylene ethylene 1-butene copolymer, wherein the amount of crystalline fraction (CF) and the amount soluble fraction (SF) are determined in 1,2,4-trichlorobenzene at 40° C.; and wherein the soluble fraction (SF) of the heterophasic propylene-ethylene copolymer or heterophasic propylene-ethylene-1-butene copolymer has an intrinsic viscosity IV (SF) in decalin at 135° C. of 2.5 to 11 dl/g; and said catalyst comprises (i) a metallocene complex, and (ii) a cocatalyst comprising a compound of a group 13 metal, wherein the metallocene complex is of formula (I):

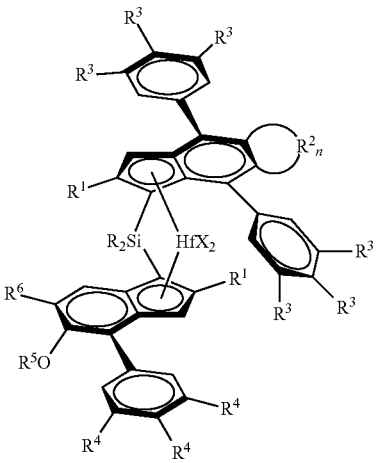

Formula (I)

wherein
each X is a sigma-ligand;
in the group $R_2Si$— at least one R is methyl or ethyl, and the other R is selected from methyl, ethyl, n-propyl, isopropyl, n-butyl or isobutyl, pentyl, hexyl, cyclohexyl, and phenyl;
each $R^1$ independently is a $CH_2$—$R^7$ group, with $R^7$ being H or linear or branched $C_{1-6}$-alkyl group, $C_{3-8}$ cycloalkyl group, or $C_{6-10}$ aryl group;
each $R^2$ is independently a —CH=, —CY=, —$CH_2$—, —CHY— or —$CY_2$— group, wherein Y is a $C_{1-6}$ hydrocarbyl group and where n is 2-6;
each $R^3$ and $R^4$ independently is hydrogen, a linear or branched $C_{1-6}$-alkyl group, a $C_{7-20}$ arylalkyl, $C_{7-20}$ alkylaryl group, $C_{6-20}$ aryl group, or an —OY group, wherein Y is a is a $C_{1-6}$ hydrocarbyl group;
$R^5$ is a linear or branched $C_{1-6}$-alkyl group, $C_{7-20}$ arylalkyl, $C_{7-20}$ alkylaryl group or $C_{6-20}$-aryl group; and
$R^6$ is a C $(R^8)_3$ group, with each $R^8$ independently being a linear or branched $C_{1-6}$ alkyl group;
(A) wherein at least one $R^3$ per phenyl group and at least one $R^4$ is not hydrogen, and wherein at least one $R^3$ per phenyl group and at least one $R^4$ is hydrogen; or
(B) wherein one $R^3$ is an —OY group, wherein Y is a is a $C_{1-6}$ hydrocarbyl group, in 4 position of each phenyl group and the two other $R^3$ groups are tert-butyl groups; and/or
(C) wherein one $R^4$ is an —OY group, wherein Y is a $C_{1-6}$ hydrocarbyl group, in 4-position of the phenyl ring and the two other $R^4$ groups are tert-butyl groups.

19. The process as claimed in claim 18, wherein:
a1) the crystalline fraction (CF) comprises a propylene homopolymer or propylene copolymer with ethylene and/or with 1-butene having 0 to 2 wt % comonomer as said matrix component; and
wherein the crystalline fraction (CF) constitutes 75.0 to 95.0 wt % and the soluble fraction (SF) constitutes 5.0 to 25.0 wt % of the heterophasic propylene ethylene copolymer or heterophasic propylene ethylene 1-butene copolymer.

20. An article comprising the heterophasic polypropylene copolymer as claimed in claim 1.

21. A polymer blend comprising the heterophasic polypropylene copolymer as claimed in claim 1 and a second different polyolefin.

22. A method of use of the heterophasic polypropylene copolymer as claimed in claim 1, the method comprising using the heterophasic polypropylene copolymer in the manufacture of an article.

\* \* \* \* \*